United States Patent
Grieshaber et al.

(10) Patent No.: US 10,421,859 B2
(45) Date of Patent: *Sep. 24, 2019

(54) HIGH FLOW, HIGH HEAT POLYCARBONATE COMPOSITIONS

(71) Applicant: SABIC GLOBAL TECHNOLOGIES B.V., Bergen op Zoom (NL)

(72) Inventors: Sarah E. Grieshaber, Glenmont, NY (US); Yuanqing He, Newburgh, IN (US); Jean-Francois Morizur, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/325,234

(22) PCT Filed: Jul. 17, 2015

(86) PCT No.: PCT/US2015/040874
§ 371 (c)(1),
(2) Date: Jan. 10, 2017

(87) PCT Pub. No.: WO2016/011332
PCT Pub. Date: Jan. 21, 2016

(65) Prior Publication Data
US 2017/0190907 A1    Jul. 6, 2017

Related U.S. Application Data

(60) Provisional application No. 62/025,926, filed on Jul. 17, 2014.

(51) Int. Cl.
*C08L 69/00* (2006.01)
*C23C 18/16* (2006.01)
*C08G 64/12* (2006.01)

(52) U.S. Cl.
CPC ............ *C08L 69/005* (2013.01); *C08L 69/00* (2013.01); *C23C 18/1641* (2013.01); *C08G 64/12* (2013.01); *C08L 2201/02* (2013.01); *C08L 2201/08* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 3,974,126 A * | 8/1976 | Narita | B01J 19/1862 528/174 |
| 4,174,359 A | 11/1979 | Sivaramakrishnan et al. | |
| 5,242,973 A | 9/1993 | Komatsu | |
| 5,605,980 A * | 2/1997 | Boutni | C08L 69/00 525/439 |
| 6,537,636 B1 * | 3/2003 | Wisnudel | C08L 69/00 362/273 |
| 2007/0123688 A1 * | 5/2007 | Mahood | C08G 64/12 528/196 |
| 2010/0168370 A1 * | 7/2010 | Hatano | C08G 63/64 528/305 |
| 2010/0317776 A1 * | 12/2010 | Wehrmann | C08G 64/14 524/91 |
| 2013/0313493 A1 | 11/2013 | Wen et al. | |
| 2017/0158853 A1 * | 6/2017 | Grieshaber | C08L 69/005 |

OTHER PUBLICATIONS

International Search Report for PCT/US2015/040874, dated Oct. 9, 2015, 4 pages.
International Search Report for PCT/US2015/040878, dated Oct. 9, 2015, 4 pages.
Written Opinion of the Internation Searching Authority for PCT/US2015/040874, dated Oct. 9, 2015, 5 pages.
Written Opinion of the International Searching Authority for PCT/US2015/040878, dated Oct. 9, 2015, 5 pages.

* cited by examiner

*Primary Examiner* — David J Buttner
(74) *Attorney, Agent, or Firm* — Cantor Colburn LLP

(57) ABSTRACT

Polycarbonate blend compositions are disclosed. The compositions include at least one polycarbonate useful for high heat applications. The compositions include at least one poly(aliphatic ester)-polycarbonate. The compositions can include one or more additional polymers. The compositions can include one or more additives. The compositions can be used to prepare articles of manufacture, and in particular, automotive bezels.

21 Claims, 2 Drawing Sheets

HIGH FLOW, HIGH HEAT POLYCARBONATE COMPOSITIONS

CROSS REFERENCE TO RELATED APPLICATIONS

This application is a national stage application of PCT/US2015/040874 filed Jul. 17, 2015, which claims priority to U.S. Provisional Application No. 62/025,926 filed Jul. 17, 2014, both of which are hereby incorporated by reference in their entirety.

TECHNICAL FIELD

The present disclosure relates generally to polycarbonate compositions, methods of using the compositions, and processes for preparing the compositions. In particular, the disclosure relates to polycarbonate compositions having improved thermal, mechanical, or rheological properties. The disclosure also relates to articles comprising the polycarbonate compositions, including metallizable articles formed from the compositions.

BACKGROUND

Polycarbonates (PC) are synthetic thermoplastic resins that can be derived from bisphenols and phosgenes by interfacial polymerization, or from bisphenols and diaryl carbonates by melt polymerization. Polycarbonates are a useful class of polymers having many desired properties. They are highly regarded for optical clarity and enhanced impact strength and ductility at room temperature.

Since part designs are becoming more and more complex, a need remains for materials that have an improved balance of properties (e.g., heat resistance, melt flow, impact resistance, and metallizability). In particular, there remains a need for improved polycarbonate compositions, and articles formed from such compositions.

SUMMARY

In one aspect, disclosed is an article including a thermoplastic composition comprising: (a) a first polycarbonate; (b) a poly(aliphatic ester)-polycarbonate copolymer; (c) optionally a second polycarbonate; and (d) optionally a third polycarbonate, provided that the third polycarbonate is different than the second polycarbonate; wherein the composition has a heat deflection temperature of at least 140° C., measured at 0.45 megapascals (Mpa) in accordance with ASTM D 648; wherein the composition has a inch viscosity of less than 170 Pascal-seconds (Pa·s), measured in accordance with ISO 11443 at 316° C. at a shear rate of 5000 reciprocal seconds ($s^{-1}$).

The first polycarbonate includes structural units derived from at least one of:

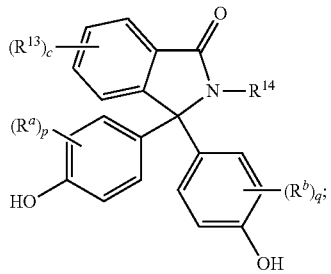

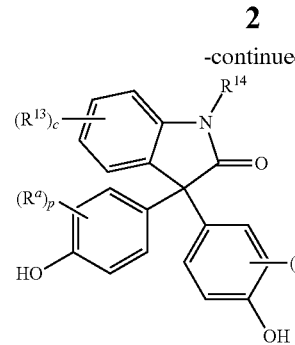

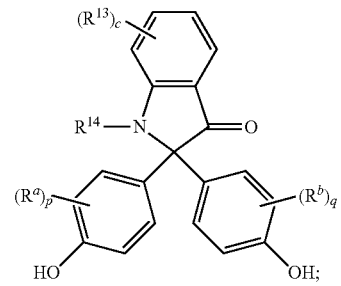

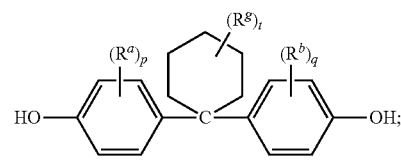

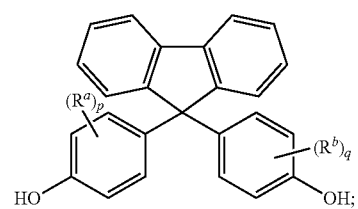

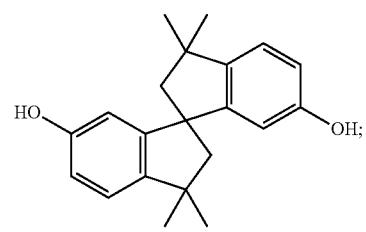

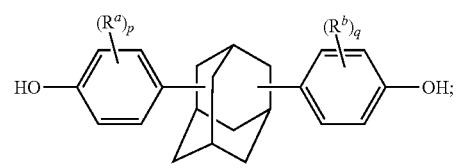

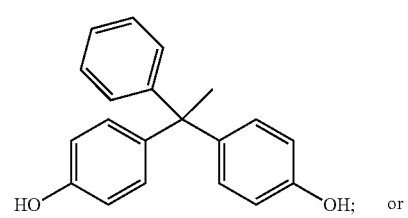

or

-continued

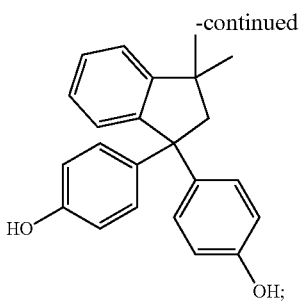

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$ alkyl or halogen, or two $R^g$ groups together with the carbon atoms to which they are attached form a four-, five, or six-membered cycloalkyl group; and t is 0 to 10.

The poly(aliphatic ester)-polycarbonate copolymer can have the formula.

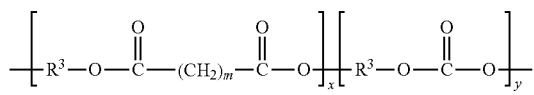

wherein m is 4 to 18; x+y is 100; and $R^3$ is formula (I) or formula (II):

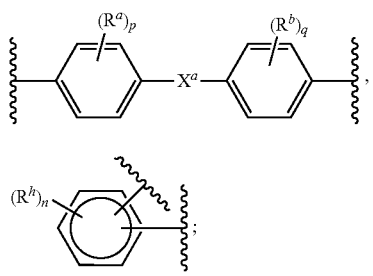

wherein $R^h$ is halogen, alkyl, or haloalkyl; n is 0 to 4; and $X^a$ is formula (III) or formula (IV):

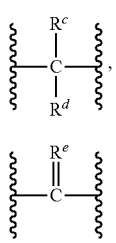

wherein $R^c$ and $R^d$ are each independently hydrogen, halogen, alkyl, cycloalkyl, cycloalkylalkyl, aryl, arylalkyl, heterocyclyl, heterocyclylalkyl, heteroaryl, or heteroarylalkyl; and $R^e$ is a divalent alkyl group.

The second polycarbonate can be a Bisphenol A (BPA) polycarbonate having a weight average molecular weight of 17,000 to 40,000 g/mol, as determined by gel permeation chromatography (GPC) using Bisphenol A (BPA) polycarbonate standards.

The third polycarbonate can be a Bisphenol A (BPA) polycarbonate, provided that the third polycarbonate is different than the second polycarbonate.

The compositions, methods, and processes are further described herein.

DETAILED DESCRIPTION

Figure 1A:
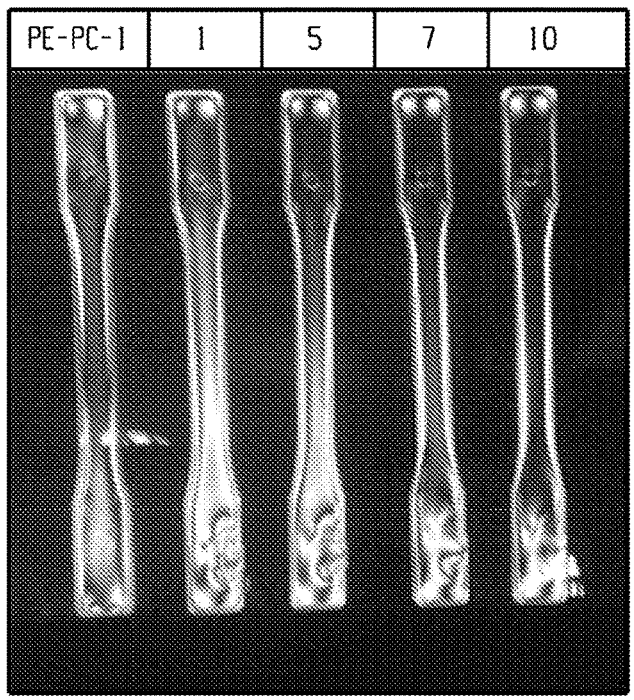
FIG. 1 depicts a series of photographs illustrating the molded stress of exemplary articles.

The present disclosure relates to polycarbonate-based blend compositions, also referred to herein as thermoplastic compositions. The compositions include at least one high heat polycarbonate and at least one poly(aliphatic ester)-polycarbonate copolymer. The compositions can include one or more additional polymers (e.g., homopolycarbonates, polysiloxane-polycarbonate copolymers, polyesters). The compositions can include one or more additives (e.g., fillers, mold release agents, antioxidants, flame retardants), The compositions can have improved thermal properties, mechanical properties, or rheological properties. The compositions can have improved optical properties (e.g., as measured by birefringence or retardation).

The compositions can be used to manufacture a variety of articles, and in particular, metallized articles suited to high heat applications. For example, the compositions can be used to prepare metallized headlamp bezels. Automotive headlamps are increasingly utilizing light sources that operate at higher temperatures and generate greater heat loads than in the past. Headlamps are also becoming a more integral part of automobile design to improve aerodynamics and aesthetic appearance. The result is that headlamp components (e.g., the lens) are closer to the light (and heat) source, necessitating use of materials that have an increased heat resistance while retaining other material characteristics.

The thermoplastic compositions are preferably directly metallizable for use in manufacture of metallized articles (e.g., metallized bezels). Additional preparation steps, such as base coating or chemical etching, can reduce the gloss of the metallized part. Thermoplastics can be evaluated for metallizability by assessing initial appearance after metallization, cross-hatch adhesion, haze onset temperature, and corrosion resistance, for example.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" can refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which can also include, in combination, additional like elements not listed.

The terms "first," "second," "third," and the like, as used herein, do not denote any order, quantity, or importance, but rather are used to distinguish one element from another.

"Alkyl" as used herein can mean a linear, branched, or cyclic hydrocarbyl group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Aryl" as used herein can mean a substituted or unsubstituted aryl radical containing from 6 to 36 ring carbon atoms. Examples of aryl include, but are not limited to, a phenyl group, a bicyclic hydrocarbon fused ring system, or a tricyclic hydrocarbon fused ring system wherein one or more of the rings are a phenyl group.

"Arylalkyl" as used herein can mean an aryl, as defined herein, appended to the parent molecular moiety through an alkyl, as defined herein.

"Copolymer" as used herein can mean a polymer derived from two or more monomeric species, as opposed to a homopolymer, which is derived from only one monomer.

"Glass Transition Temperature" or "Tg" as used herein can mean the maximum temperature that a polymer, such as a polycarbonate, will have one or more useful properties. These properties include impact resistance, stiffness, strength, and shape retention. The Tg of a polycarbonate therefore can be an indicator of its useful upper temperature limit, particularly in plastics applications. The Tg of a polymer, such as a polycarbonate, can depend primarily on the composition of the polymer. Polycarbonates that are formed from monomers having more rigid and less flexible chemical structures than BPA generally have higher Tgs than BPA polycarbonate, while polycarbonates that are formed from monomers having less rigid and more flexible chemical structures than BPA generally have lower Tgs than BPA polycarbonate. For example, a polycarbonate formed from 33 mole percent (mol %) of a rigid monomer, 3,3-bis(4-hydroxyphenyl)-2-phenylisoindolin-1-one ("PPPBP"), and 67 mol % BPA has a Tg of 198° C., while a polycarbonate formed from Bisphenol-A, but also having 6 weight percent (wt %) of siloxane units, a flexible monomer, has a Tg of 145° C. Mixing of two or more polycarbonates having different Tgs can result in a Tg value for the mixture that is intermediate between the Tgs of the polycarbonates that are mixed. The Tg of a polycarbonate can also be an indicator of the molding or extrusion temperatures required to form polycarbonate parts. The higher the Tg of the polycarbonate the higher the molding or extrusion temperatures that are needed to form polycarbonate parts.

The Tg described herein are measures of heat resistance of, for example, polycarbonate and polycarbonate blends. The Tg can be determined by differential scanning calorimetry. The calorimetry method can use a TA Instruments Q1000 instrument, for example, with setting of 20° C./min ramp rate and 40° C., start temperature and 200° C. end temperature.

"Heteroaryl" as used herein can mean any aromatic heterocyclic ring which can comprise an optionally benzo-condensed 5 or 6 membered heterocycle with from 1 to 3 heteroatoms selected among N, O or S. Non limiting examples of heteroaryl groups can include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazolyl, pyrazolyl, thienyl, henzothienyl, isoindolinyl, benzoimidazolyl, isoquinolinyl, 1,2,3-triazolyl, 1-phenyl-1,2,3-triazolyl, and the like.

Unless otherwise indicated, each of the foregoing groups can be unsubstituted or substituted, provided that the substitution does not significantly adversely affect synthesis, stability, or use of the compound.

"Thermal stability" as used herein refers to resistance of a polymer to molecular weight degradation under thermal conditions. Thus, a polymer with poor thermal stability can show significant molecular weight degradation under thermal conditions, such as during extrusion, molding, thermoforming, hot-pressing, and like conditions. Molecular weight degradation can also be manifest through color formation or in the degradation of other properties such as weatherability, gloss, mechanical properties, or thermal properties. Molecular weight degradation can also cause significant variation in processing conditions such as melt viscosity changes.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Disclosed are polycarbonate-based blend compositions. The compositions include at least one high heat polycarbonate, which can be referred to herein as "the first polycarbonate." The compositions include at least one poly (aliphatic ester)-polycarbonate copolymer. The compositions can include one or more additional polycarbonates, which can be referred to herein as "the second polycarbonate," "the third polycarbonate," and the like. The compositions can include one or more polyesters, which can be referred to herein as "the first polyester," "the second polyester," and the like. The compositions can include one or more hydroxyl-functionalized flow promoters (e.g., alkylene glycols). The compositions can include one or more additives.

The compositions include at least one polycarbonate. Polycarbonates of the disclosed blend compositions can be homopolycarbonates, copolymers comprising different moieties in the carbonate units (referred to as "copolycarbonates"), copolymers comprising carbonate units and other types of polymer units such as polysiloxane units, polyester units, and combinations thereof.

The polycarbonates can include identical or different repeating units derived from one or more monomers (e.g., a second, third, fourth, fifth, sixth, etc., other monomer compound). The monomers of the polycarbonate can be randomly incorporated into the polycarbonate. For example, a polycarbonate copolymer can be arranged in an alternating sequence following a statistical distribution, which is independent of the mole ratio of the structural units present in the polymer chain. A random polycarbonate copolymer can have a structure, which can be indicated by the presence of several block sequences (I-I) and (O-O) and alternate sequences (I-O) or (O-I), that follow a statistical distribution. In a random x:(1-x) copolymer, wherein x is the mole percent of a first monomer(s) and 1-x is the mole percent of the monomers, one can calculate the distribution of each monomer using peak area values determined by $^{13}C$ nuclear magnetic resonance (NMR) spectroscopy, for example.

A polycarbonate copolymer can have alternating I and O units (-I-O-I-O-I-O-I-O-), or I and O units arranged in a repeating sequence (e.g. a periodic copolymer having the formula: (I-O-I-O-O-I-I-I-I-O-O-O)n). The polycarbonate copolymer can be a statistical copolymer in which the sequence of monomer residues follows a statistical rule. For example, if the probability of finding a given type monomer residue at a particular point in the chain is equal to the mole fraction of that monomer residue in the chain, then the polymer can be referred to as a truly random copolymer. The polycarbonate copolymer can be a block copolymer that comprises two or more homopolymer subunits linked by covalent bonds (-I-I-I-I-I-O-O-O-O-O-). The union of the homopolymer subunits can require an intermediate non-repeating subunit, known as a junction block. Block copolymers with two or three distinct blocks are called diblock copolymers and triblock copolymers, respectively.

The poly-carbonates can include any suitable mol % of selected monomer units. The polymers can comprise 1 to 99.5 mol %, 5 to 95 mol %, 10 to 90 mol %, 15 to 85 mol %, 20 to 80 mol %, 25 to 75 mol %, 30 to 70 mol %, 35 to 65 mol %, 40 to 60 mol %, or 45 to 55 mol % of a selected monomer unit.

The polycarbonates can have a Tg of greater than or equal to 120° C., greater than or equal to 125° C. greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 200° C. greater than or equal to 210° C., greater than or equal to 220° C., greater than or equal to 230° C., greater than or equal to 240° C., greater than or equal to 250° C., greater than or equal to 260° C., greater than or equal to 270° C., greater than or equal to 280° C., greater than or equal to 290° C., or greater than or equal to 300° C., as measured using a differential scanning calorimetry method. In any of the foregoing embodiments, the Tg of the polycarbonate can be less than 500° C., or less than 450° C., or less than 400° C., or less than 380° C. In some embodiments the Tg of the polycarbonates is 150° C. to 380° C.

The polycarbonates can have a weight average molecular weight (Mw) of 1,500 to 150,000 Daltons (Da) [± 1,000 Da], of 10,000 to 50,000 Da [±1,000 Da], of 15,000 to 35,000 Da [± 1,000 Da], or of 20,000 to 30,000 Da [± 1,000 Da]. In certain embodiments, the polycarbonates have weight average molecular weights of 15,000 Da [± 1,000 Da], 16,000 Da [± 1,000 Da], 17,000 Da [± 1,000 Da], 18,000 Da [± 1,000 Da], 19,000 Da [± 1,000 Da], 20,000 Da [± 1,000 Da], 21,000 Da [± 1,000 Da], 22,000 Da [± 1,000 Da], 23,000 Da [± 1,000 Da], 24,000 Da [± 1,000 Da], 25,000 Da [± 1,000 Da], 26,000 Da [± 1,000 Da], 27,000 Da [± 1,000 Da], 28,000 Da[± 1,000 Da], 29,000 Da [± 1,000 Da], 30,000 Da [± 1,000 Da], 31,000 Da [± 1,000 Da], 32,000 Da [± 1,000 Da], 33,000 Da [± 1,000 Da], 34,000 Da [± 1,000 Da], or 35,000 Da [± 1,000 Da]. In any of the foregoing embodiments, the Mw of the polycarbonate can be less than 100,000 Da, or less than 75,000 Da, or less than 50,000 Da. In some embodiments the Mw of the polycarbonates can be 15,000 to 50,000 Da. Molecular weight determinations can be performed using GPC, using a cross-linked styrene-divinylbenzene column and calibrated to polycarbonate references using a UV-VIS detector set at 254 nanometers (nm). Samples can be prepared at a concentration of 1 milligram per milliliter (mg/ml), and eluted at a flow rate of 1.0 milliliter per minute (ml/min).

The polycarbonates can have a polydispersity index (PDI) of 1.0 to 10.0, 2.0 to 7.0, or 2.0 to 6.0. In certain embodiments, the polycarbonates have PTAs of 2.50, 3.00, 3.50, 4.00, 4.50, 5.00, 5.50, 6.00, 6.50, 7.00, or 7.50. In certain embodiments, the polycarbonates have a PDI of 2.0, 2.1, 2.2, 2.3, 2.4, 2.5, 2.6, 2.7, 2.8, 2.9, or 3.0. In certain embodiments, the polycarbonates have a PDI of 2.2 or 2.3.

The polycarbonates can have a biocontent of 2 to 90 weight % (wt %); 5 to 25 wt %; 10 to 30 wt %; 15 to 35 wt %; 20 to 40 wt %; 25 to 45 wt %; 30 to 50 wt %; 35 to 55 wt %; 40 to 60 wt %; 45 to 65 wt %; 55 to 70 wt %; 60 to 75 wt %; 50 to 80 wt %; or 50 to 90 wt %. The biocontent can be measured according to ASTM D6866.

The term "polycarbonate" and "polycarbonate resin" refers to compositions having repeating units of formula (1):

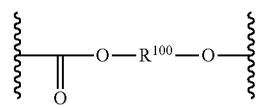

(1)

wherein each $R^{100}$ can independently comprise any suitable organic group, such as an aliphatic, alicyclic, or aromatic group, or any combination thereof. In certain embodiments, $R^{100}$ in the carbonate units of formula (1) can be a $C_6$-$C_{36}$ aromatic group wherein at least one moiety is aromatic.

The repeating units of formula (1) can be derived from dihydroxy compounds of formula (2):

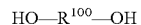

(2)

wherein $R^{100}$ is as defined above.

The polycarbonate can include repeating units of formula (3):

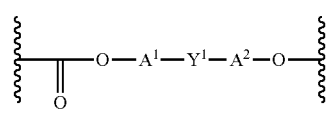

(3)

wherein each of the $A^1$ and $A^2$ is a monocyclic divalent aryl group and $Y^1$ is a bridging group having one or two atoms that separate $A^1$ and $A^2$. For example, one atom can separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptyl-idene, ethylidene, isopropylidene, neopentylidene, cyclohexylidene, cyclopentadecyclidene, cyclododecylidene, and adamantylidene. The bridging group of $Y^1$ can be a hydrocarbon group such as methylene, cyclohexylidene, or isopropylidene.

The repeating units of formula (3) can be derived from a dihydroxy monomer unit of formula (4):

$$HO-A^1-Y^1-A^2-OH \quad (4)$$

wherein $A^1$, $A^2$, and $Y^1$ are as defined above.

The polycarbonate can include repeating units of formula (5):

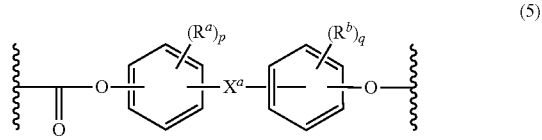

(5)

wherein $R^a$ and $R^b$ are each independently halogen, $C_1$-$C_{12}$ alkyl, alkenyl, $C_3$-$C_8$ cycloalkyl, or $C_1$-$C_{12}$, alkoxy; p and q are each independently 0 to 4; and $X^a$ is a bridging group between the two arylene groups. $X^a$ can be a single bond, —O—, —S—, —S(O)—, —S(O)$_2$—, —C(O)—, or a $C_1$-$C_{18}$ organic group. The $C_1$-$C_{18}$ organic bridging group can be cyclic or acyclic, aromatic or non-aromatic, and can optionally include halogens, heteroatoms (e.g., oxygen, nitrogen, sulfur, silicon, or phosphorous), or a combination thereof. The $C_1$-$C_{18}$ organic group can be disposed such that the $C_6$ arylene groups connected thereto are each connected to a common alkylidene carbon or to different carbons of the $C_1$-$C_{18}$ organic bridging group. The bridging group $X^a$ and the carbonate oxygen atoms of each $C_6$ arylene group can be disposed ortho, meta, or para (specifically para) to each other on the $C_6$ arylene group. Exemplary $X^a$ groups include, but are not limited to, methylene, ethylidene, neopentylidene, isopropylidene, cyclohexyhnethylidene, 1,1-ethene, 2-[2.2.1]-bicycloheptylidene, cyclohexylidene, cyclopentylidene, cyclododecylidene, and adamantylidene.

In certain embodiments, p and q are each 1; $R^a$ and $R^b$ are each a $C_1$-$C_{13}$ alkyl group, specifically methyl, disposed meta to the oxygen on each ring; and $X^a$ is isopropylidene. In certain embodiments, p and q are both 0; and $X^a$ is isopropylidene.

In certain embodiments, $X^a$ can have formula (6):

(6)

wherein $R^c$ and $R^d$ are each independently hydrogen, halogen, alkyl (e.g., $C_1$-$C_{12}$ alkyl), cycloalkyl (e.g., $C_3$-$C_{12}$ cycloalkyl), cycloalkylalkyl (e.g., $C_3$-$C_{12}$-cycloalkyl-$C_1$-$C_6$-alkyl), aryl (e.g., $C_6$-$C_{12}$ aryl) arylalkyl (e.g., $C_6$-$C_{12}$-aryl-$C_1$-$C_6$-alkyl), heterocyclyl (e.g., five- or six-membered heterocyclyl having one, two, three, or four heteroatoms independently selected from nitrogen, oxygen, and sulfur), heterocyclylalkyl (e.g., five- or six-membered heterocyclyl-$C_1$-$C_6$-alkyl), heteroaryl (e.g., five- or six-membered heteroaryl having one, two, three, or four heteroatoms independently selected from nitrogen, oxygen, and sulfur), or heteroarylalkyl (e.g., five- or six-membered heteroaryl-$C_1$-$C_6$-alkyl), wherein said alkyl, cycloalkyl, cycloalkylalkyl, aryl, arylalkyl, heterocyclyl, heterocyclylalkyl, heteroaryl, and heteroarylalkyl are each independently unsubstituted or substituted (e.g., substituted with 1 to 3 substituents independently selected from the group consisting of —OH, —NH$_2$, —NO$_2$, —CN, halo, $C_1$-$C_4$-alkyl, $C_1$-$C_4$-alkoxy-$C_1$-$C_4$-alkyl, halo-$C_1$-$C_4$-alkyl, halo-$C_1$-$C_4$-alkoxy-$C_1$-$C_4$-alkyl, hydroxy-$C_1$-$C_4$-alkyl, amino-$C_1$-$C_4$-alkyl, $C_1$-$C_4$-alkylamino-$C_1$-$C_4$-alkyl, di($C_1$-$C_4$-alkyl)amino-$C_1$-$C_4$-alkyl, azido-$C_1$-$C_4$-alkyl, cyano-$C_1$-$C_4$-alkyl, $C_1$-$C_4$-alkoxy, halo-$C_1$-$C_4$-alkoxy, $C_1$-$C_4$-alkoxy-$C_1$-$C_4$-alkoxy, $C_2$-$C_4$-alkenyl, and $C_2$-$C_4$-alkynyl). In certain embodiments, $R^c$ and $R^d$ are each independently hydrogen or $C_1$-$C_8$ alkyl. In certain embodiments, $R^c$ and $R^d$ are each methyl. Exemplary groups of formula (6) include, but are not limited to, methylene, ethylidene, neopentylidene, and isopropylidene.

In certain embodiments, $X^a$ can have formula (7):

(7)

wherein $R^e$ is a divalent $C_1$-$C_{31}$ group. In certain embodiments, $R^e$ is a divalent hydrocarbyl (e.g., a $C_{12}$-$C_{31}$ hydrocarbyl), a cycloalkylidene (e.g., a $C_5$-$C_{18}$ cycloalkylidene), a cycloalkylene (e.g., a $C_5$-$C_{18}$ cycloalkylene), a heterocycloalkylidene (e.g., a $C_3$-$C_{18}$ heterocycloalkylidene), or a group of the formula —B$^1$-G-B$^2$— wherein B$^1$ and B$^2$ are the same or different alkylene group (e.g., a $C_1$-$C_6$ alkylene group) and G is a cycloalkylidene group (e.g., a $C_3$-$C_{12}$ cycloalkylidene group) or an arylene group (e.g., a $C_6$-$C_{16}$ arylene group), wherein said hydrocarbyl, cycloalkylidene, cycloalkylene, and heterocycloalkylidene are each independently unsubstituted or substituted (e.g., substituted with 1 to 3 substituents independently selected from the group consisting of —OH, —NH$_2$, —NO$_2$, —CN, halo, $C_1$-$C_4$-alkyl, $C_1$-$C_4$-alkoxy-$C_1$-$C_4$-alkyl, halo-$C_1$-$C_4$-alkyl, halo-$C_1$-$C_4$-alkoxy-$C_1$-$C_4$-alkyl, hydroxy-$C_1$-$C_4$-alkyl, amino-$C_1$-$C_4$-alkyl, $C_1$-$C_4$-alkylamino-$C_1$-$C_4$-alkyl, di($C_1$-$C_4$-alkyl)amino-$C_1$-$C_4$-alkyl, azido-$C_1$-$C_4$-alkyl, cyano-$C_1$-$C_4$-alkyl, $C_1$-$C_4$-alkoxy, halo-$C_1$-$C_4$-alkoxy, $C_1$-$C_4$-alkoxy-$C_1$-$C_4$-alkoxy, $C_2$-$C_4$-alkenyl, and $C_2$-$C_4$-alkynyl). Exemplary groups of formula (7) include, but are not limited to, 2-[2.2.1]-bicycloheptylidene, cyclohexylidene, cyclopentylidene, cyclododecylidene, and adamantylidene.

The repeating structural units of formula (5) can be derived front a dihydroxy monomer unit of formula (8):

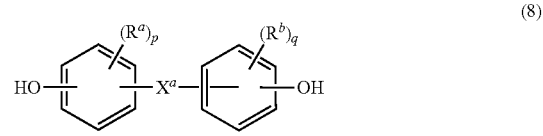

(8)

wherein $X^a$, $R^a$, $R^b$, p, and q are as defined above. In certain embodiments, p and q are both 0, and $X^a$ is isopropylidene.

The polycarbonate can include repeating units of formula (9), formula (10), formula (11), or a combination thereof:

(9)
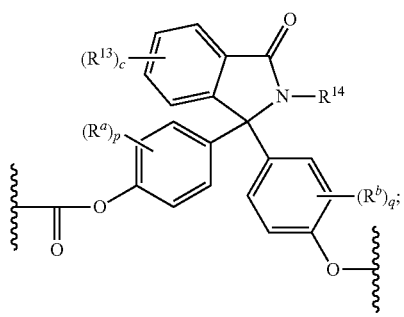

(10)
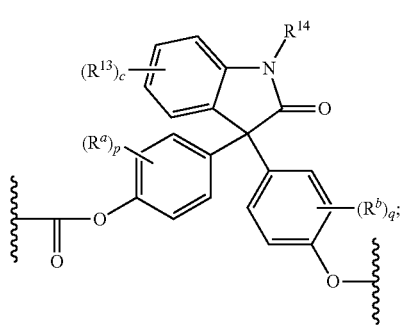

(11)
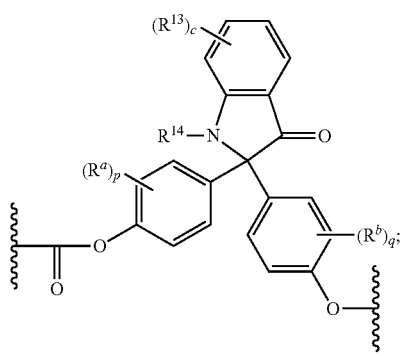

wherein $R^{13}$ at each occurrence is independently a halogen or a $C_1$-$C_6$ alkyl group; $R^{14}$ is independently a $C_1$-$C_6$ alkyl, phenyl, or phenyl substituted with up to five halogens or $C_1$-$C_6$ alkyl groups; $R^a$ and $R^b$, at each occurrence, are each independently a halogen, $C_1$-$C_{12}$ alkyl, $C_1$-$C_{12}$ alkenyl, $C_2$-$C_8$ cycloalkyl, or $C_1$-$C_{12}$ alkoxy; c is independently 0 to 4; and p and q are each independently 0 to 4. In a specific embodiment, $R^{14}$ is a $C_1$-$C_6$ alkyl or phenyl group. In still another embodiment, $R^{14}$ is a methyl or phenyl group. In another specific embodiment, c is 0; p is 0; and q is 0.

The repeating structural units of formula (9) can be derived from a dihydroxy monomer unit of formula (12); the repeating structural units of formula (10) can be derived from a dihydroxy monomer unit of formula (13); and the repeating structural units of formula (11) can be derived from a dihydroxy monomer unit of formula (14):

(12)
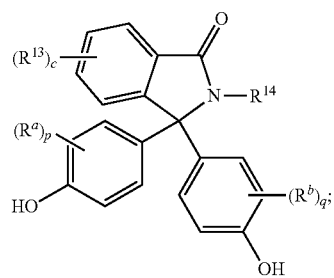

(13)
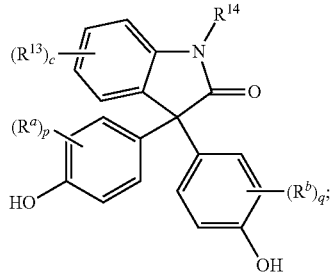

(14)
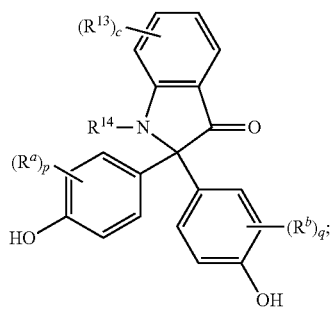

wherein $R^a$, $R^b$, $R^{13}$, c, p, and q are as defined above. Such dihydroxy compounds can be useful for high heat applications.

The dihydroxy compound of formula (12) can have formula (15), which can be useful for high heat applications:

(15)
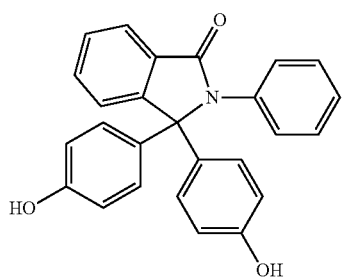

(also known as 3,3-bis(4-hydroxyphenyl)-2-phenytisoindolin-1-one (PPPBP)).

The polycarbonate can include repeating units of formula (16):

(16)
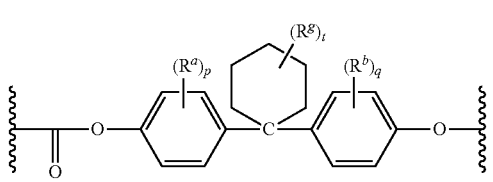

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; $R^g$ is independently $C_1$-$C_{12}$ alkyl or halogen, or two $R^g$ groups together with the carbon atoms to which they are attached can form a four-, five-, or six-membered cycloalkyl group; p and q are each independently 0 to 4; and t is 0 to 10. $R^a$ and $R^b$ can be disposed meta to the cyclohexylidene bridging group. The substituents $R^a$, $R^b$ and $R^g$ can, when comprising an appropriate number of carbon atoms, be straight chain, cyclic, bicyclic, branched, saturated, or unsaturated. In some embodiments, $R^a$, $R^b$ and $R^g$ are each independently $C_1$-$C_4$ alkyl, p and q are each 0 or 1, and t is 0 to 5. In some embodiments, $R^a$, $R^b$ and $R^g$ are each methyl, p and q are each 0 or 1, and t is 0 or 3. The cyclohexylidene-bridged bisphenol can be the reaction product of two moles of o-cresol with one mole of cyclohexanone. In some embodiments, the cyclohexylidene-bridged bisphenol can be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high Tgs and high heat distortion temperatures. Cyclohexyl bisphenol-containing polycarbonates, or a combination comprising at least one of the foregoing with other bisphenol polycarbonates, are supplied by Bayer Co. under the APEC trade name.

The repeating structural units of formula (16) can be derived from a dihydroxy monomer unit of formula (17):

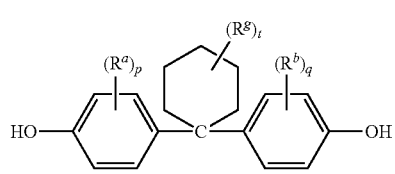

(17)

wherein $R^a$, $R^b$, $R^g$, p, q, and t are as defined above.

The dihydroxy compound of formula (17) can have formula (18), which can be useful for high heat applications:

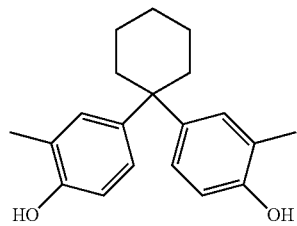

(18)

(also known as 1,1-bis(4-hydroxy-3-methylphenyl)cyclohexane (DMBPC)).

The dihydroxy compound of formula (17) can have formula (19), which can be useful for high heat applications:

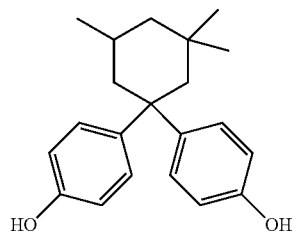

(19)

(also known as bisphenol isophorone).

The dihydroxy compound of formula (17) can have formula (20), which can be useful for high heat applications:

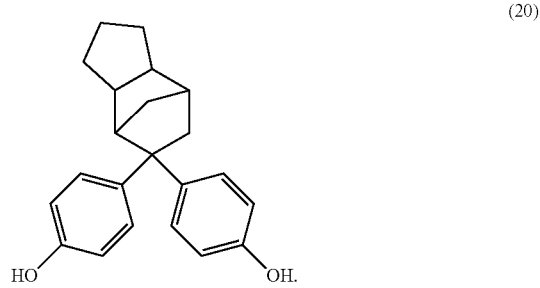 [SMILES: Oc1ccc(C2(c3ccc(O)cc3)CC3CC2C2CCCC32)cc1]

(20)

The polycarbonate can include repeating units of formula (21):

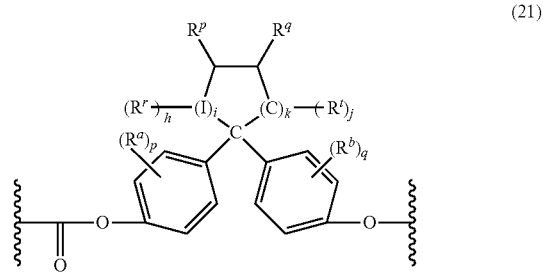

(21)

wherein $R^r$, $R^p$, $R^q$ and $R^t$ are each independently hydrogen, halogen, oxygen, or a $C_1$-$C_{12}$ organic group; $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; I is a direct bond, a carbon, or a divalent oxygen, sulfur, or —N(Z)— where Z is hydrogen, halogen, hydroxy, $C_1$-$C_{12}$ alkyl, $C_1$-$C_{12}$ alkoxy, $C_6$-$C_{12}$ aryl, or $C_1$-$C_{12}$ acyl; h is 0 to 2, j is 1 or 2, i is an integer of 0 or 1, k is an integer of 0 to 3, p is an integer of 0 to 4, and q is an integer 0 to 4, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (21) will have an unsaturated carbon-carbon linkage where the ring is fused. When i is 0, h is 0, and k is 1, the ring as shown in formula (21) contains 4 carbon atoms; when i is 0, h is 0, and k is 2, the ring as shown contains 5 carbon atoms, and when i is 0, h is 0, and k is 3, the ring contains 6 carbon atoms. In some embodiments, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

The repeating structural units of formula (21) can be derived from a dihydroxy monomer unit of formula (22):

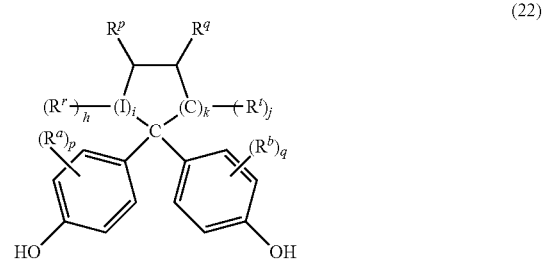

(22)

wherein $R^a$, $R^b$, $R^r$, $R^p$, $R^q$, $R^t$, I, h, i, j, k, p, and q are as defined above.

The polycarbonate can include repeating units of formula (23):

(23)

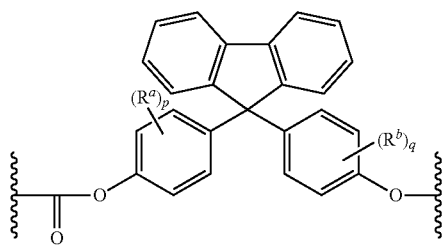

wherein $R^a$ and $R^b$ are each independently halogen, $C_1$-$C_{12}$ alkyl, $C_1$-$C_{12}$ alkenyl, $C_3$-$C_8$ cycloalkyl, or $C_{12}$ alkoxy; and p and q are each independently 0 to 4. In certain embodiments, at least one of each of $R^a$ and $R^b$ are disposed meta to the cycloalkylidene bridging group. In certain embodiments, $R^a$ and $R^b$ are each independently $C_1$-$C_3$ alkyl; and p and q are each 0 or 1. In certain embodiments, $R^a$ and $R^b$ are each methyl; and p and q are each 0 or 1.

The repeating structural units of formula (23) can be derived from a dihydroxy monomer unit of formula (24):

(24)

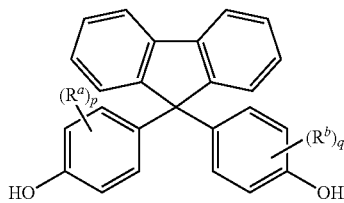

wherein $R^a$, $R^b$, p, and q are as defined above. Such dihydroxy compounds that might impart high Tgs to the polycarbonate as a copolycarbonate are described in U.S. Pat. No. 7,244,804.

The dihydroxy compound of formula (24) can have formula (25), which can be useful for high heat applications:

(25)

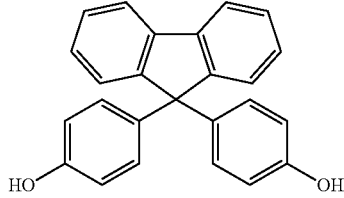

(also known as 9,9-bis(4-hydroxyphenyl)fluorene).

The polycarbonate can include repeating units of formula (26):

(26)

wherein $R^a$ and $R^b$) are each independently halogen, $C_1$-$C_{12}$ alkyl, $C_1$-$C_{12}$ alkenyl, $C_3$-$C_8$ cycloalkyl, or $C_1$-$C_{12}$ alkoxy; and p and q are each independently 0 to 4. In certain embodiments, at least one of each of $R^a$ and $R^b$ are disposed meta to the cycloalkylidene bridging group. In certain embodiments, $R^a$ and $R^b$ are each independently $C_1$-$C_3$ alkyl; and p and q are each 0 or 1. In certain embodiments, $R^a$ and $R^b$ are each methyl; and p and q are each 0 or 1.

The repeating structural units of formula (26) can be derived from a dihydroxy monomer unit of formula (27):

(27)

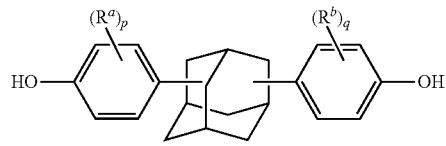

wherein $R^a$, $R^b$, p, and q are as defined above. Such dihydroxy compounds that might impart high Tgs to the polycarbonate are described in U.S. Pat. Nos. 7,112,644 and 3,516,968.

The dihydroxy compound of formula (27) can have formula (28) (also known as 2,2-bis(4-hydroxyphenyl)adamantane), or of formula (29) (also known as 4,4'-(1-phenylethane-1,1-diyl)diphenol (bisphenol-AP) or 1,1-bis(4-hydroxyphenyl)-1-phenyl-ethane), or of formula (30) (also known as 6,6'-dihydroxy-3,3,3',3'-tetramethylspiro(bis)indane), or of formula (31) (also known as 4,4'-(3,3-dimethyl-2,2-dihydro-1H-indene-1,1-diyl)diphenol), any of which can be useful for high heat applications.

(28)

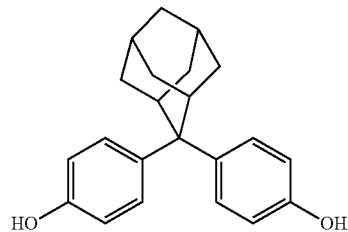

(29)

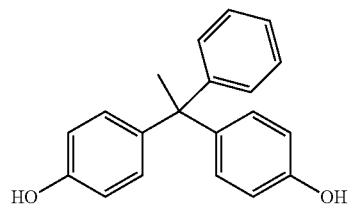

(30)

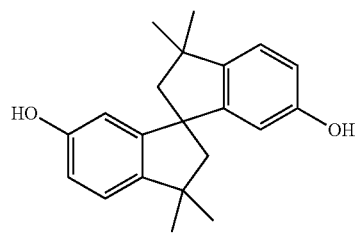

(31)

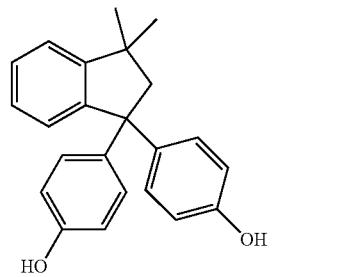

Exemplary monomers for inclusion in the polycarbonate include, but are not limited to, 4,4'-dihydroxybiphenyl, 1,1-bis(4-hydroxyphenyl)methane, bis(4-hydroxyphenyl) acetonitrile, bis(4-hydroxyphenyl)phenylmethane, bis(4-hydroxyphenyl)-1-naphthytmethane, 1,1-bis(4-hydroxyphenyl)ethane, 1,2-bis(4-hydroxyphenyl)ethane, 1,1-bis(4-hydroxyphenyl)-1-phenylethane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 1,1-bis(4-hydroxyphenyl)propane, 1,1-bis(4-hydroxy-t-butylphenyl)propane, 2,2-bis(4-hydroxyphenyl)propane ("bisphenol-A" or "BPA"), 2-(4-hydroxyphenyl)-2-(3-hydroxyphenyl)propane, 2,2-bis(4-hydroxy-2-methylphenyl)propane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxy-3-bromophenyl)propane, 2,2-bis(4-hydroxyphenyl)hexafluoropropane, 1,1-bis(4-hydroxyphenyl)n-butane, 2,2-bis(4-hydroxyphenyl)butane, 3,3-bis(4-hydroxyphenyl)-2-butanone, 1,1-bis(4-hydroxyphenyl)isobutene, trans-2,3-bis(4-hydroxyphenyl)-2-butene, 1,6-bis(4-hydroxyphenyl)-1,6-hexanedione, 2,2-bis(4-hydroxyphenyl)octane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)cyclododecane, 2,2-bis(4-hydroxyphenyl)adamantane, (alpha, alpha'-bis(4-hydroxyphenyl)toluene, 4,4'-dihydroxybenzophenone, 2,7-dihydroxypyrene, bis(4-hydroxyphenyl)ether, ethylene glycol bis(4-hydroxyphenyl)ether, bis(4-hydroxyphenyl)sulfide, bis(4-hydroxyphenyl)sulfoxide, bis(4-hydroxyphenyl)sulfone, bis(4-hydroxyphenyl)diphenylmethane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 2-phenyl-3,3-bis(4-hydroxyphenyl)phthalimidine (also referred to as 3,3-bis(4-hydroxyphenyl)-2-phenylisoindolin-1-one or "PPPBP"), 9,9-bis(4-hydroxyphenyl)fluorene, and bisphenol isophorone (also referred to as 4,4'-3,3,5-trimethylcyclohexane-1,1-diyl)diphenol or "BPI"), 1,1-bis(4-hydroxy-3-methylphenyl)cyclohexane ("DMBPC"), tricyclopentadienyl bisphenol (also referred to as 4,4'-(octahydro-1H-4,7-methanoindene-5,5-diyl)diphenol), 2,2-bis(4-hydroxyphenyl)adamantane ("BCF"), 1,1-bis(4-hydroxyphenyl)-1-phenyl ethane ("BPAP"), and 3,3-bis(4-hydroxyphenyl)phthalide, or any combination thereof.

Exemplary monomers useful for increasing the Tg of the polycarbonate include, but are not limited to, bis(4-hydroxyphenyl)diphenylmethane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 2-phenyl-3,3-bis(4-hydroxyphenyl)phthalimidine (also referred to as 3,3-bis(4-hydroxyphenyl)-2-phenylisoindolin-1-one or "PPPBP"), 9,9-bis(4-hydroxyphenyl)fluorene, and bisphenol isophorone (also referred to as 4,4'-(3,3,5-trimethylcyclohexane-1,1-diyl)diphenol or "BPI"), 1,1-bis(4-hydroxy-3-methylphenyl)cyclohexane ("DMBPC"), tricyclopentadienyl bisphenol (also referred to as 4,4'-(octahydro-1H-4,7-methanoindene-5,5-diyl)diphenol), 2,2-bis(4-hydroxyphenyl)adamantane ("BCF"), 1,1-bis(4-hydroxyphenyl)-1-phenyl ethane ("BPAP"), and 3,3-bis(4-hydroxyphenyl)phthalide, or any combination thereof.

Other dihydroxy monomer units that can be used include aromatic dihydroxy compounds of formula (32):

(32)

wherein each $R^h$ is independently a halogen atom, a $C_1$-$C_{10}$ hydrocarbyl such as a $C_1$-$C_{10}$ alkyl group, or a halogen substituted $C_1$-$C_{10}$ hydrocarbyl such as a halogen-substituted $C_1$-$C_{10}$ alkyl group, and n is 0 to 4. The halogen, when present, is usually bromine.

Examples of aromatic dihydroxy compounds represented by formula (31) include, but are not limited to, resorcinol, substituted resorcinol compounds (e.g., 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol), catechol, hydroquinone, substituted hydroquinones 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations thereof.

The compositions can include one or more polyester-polycarbonate copolymers. The polyester-polycarbonate can comprise repeating ester units of formula (33):

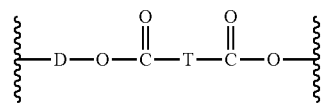

(33)

wherein O-D-O of formula (33) is a divalent group derived from a dihydroxy compound, and D can be, for example, one or more alkyl containing $C_6$-$C_{20}$ aromatic group(s), or one or more $C_6$-$C_{20}$ aromatic group(s), a $C_2$-$C_{20}$ alkylene group, a $C_6$-$C_{20}$ alicyclic group, a $C_6$-$C_{20}$ aromatic group or a polyoxyalkylene group in which the alkylene groups contain 2 to 6 carbon atoms, specifically 2, 3, or 4 carbon atoms. D can be a $C_2$-$C_{30}$ alkylene group having a straight chain, branched chain, or cyclic (including polycyclic) structure. O-D-O can be derived from a compound of formula (2), as described above. O-D-O can be derived from an aromatic dihydroxy compound of formula (4), as described above. O-D-O can be derived from an aromatic dihydroxy compound of formula (8), as described above.

The molar ratio of ester units to carbonate units in the polyester-polycarbonates can vary broadly, for example 1:99 to 99:1, specifically 10:90 to 90:10, more specifically 25:75 to 75:25, optionally expanded depending on the desired properties of the final composition.

T of formula (33) can be a divalent group derived from a dicarboxylic acid, and can be, for example, a $C_2$-$C_{10}$ alkylene group, a $C_6$-$C_{20}$ alicyclic group, a $C_6$-$C_{20}$ alkyl aromatic group, a $C_6$-$C_{20}$ aromatic group, or a $C_6$-$C_{36}$ divalent organic group derived from a dihydroxy compound or chemical equivalent thereof. T can be an aliphatic group, wherein the molar ratio of carbonate units to ester units of formula (33) in the poly(aliphatic ester)-polycarbonate copolymer is from 99:1 to 60:40; and 0.01 to 10 weight percent, based on the total weight of the polymer component, of a polymeric containing compound. T can be derived from a $C_6$-$C_{20}$ linear aliphatic alpha-omega (α-ω) dicarboxylic ester.

Diacids from which the T group in the ester unit of formula (33) is derived include aliphatic dicarboxylic acids having from 6 to 36 carbon atoms, optionally from 6 to 20 carbon atoms. The $C_6$-$C_{20}$ linear aliphatic alpha-omega (α-ω) dicarboxylic acids can be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids.

The ester units of the polyester-polycarbonates of formula (33) can be further described by formula (34), wherein T is $(CH_2)_m$, where m is 4 to 40, or optionally m is 4 to 18. m can be 8 to 10.

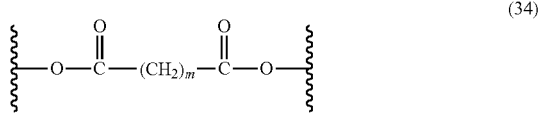

(34)

Saturated aliphatic alpha-omega dicarboxylic acids can be adipic acid, sebacic or dodecanedioic acid. Sebacic acid is a dicarboxylic acid having the following formula (35):

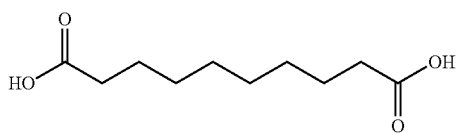

(35)

Sebacic acid has a molecular mass of 202.25 Da, a density of 1.209 g/cm³ (25° C.), and a melting point of 294.4° C. at 100 mmHg. Sebacic acid is extracted from castor bean oil found in naturally occurring castor beans.

The poly(aliphatic ester)-polycarbonate can include less than or equal to 25 mol % of the aliphatic dicarboxylic acid unit. The poly(aliphatic ester)-polycarbonate can comprise units of formula (34) in an amount of 0.5 to 10 mol %, specifically 1 to 9 mol %, and more specifically 3 to 8 mol %, based on the total amount of the poly(aliphatic ester)-polycarbonate.

The poly(aliphatic ester)-polycarbonate can be a copolymer of aliphatic dicarboxylic acid units and carbonate units. The poly(aliphatic ester)-polycarbonate is shown in formula (36):

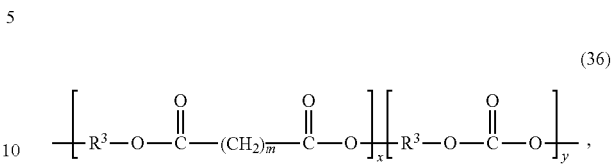

(36)

where each $R^3$ is independently derived from a dihydroxyaromatic compound of formula (8) or (32), m is 4 to 18, and x and y each represent average weight percentages of the poly(aliphatic ester)-polycarbonate where x+y is 100.

A specific embodiment of the poly(aliphatic ester)-polycarbonate is as shown in formula (37), where m is 4 to 18 and x and y are as defined for formula (36)

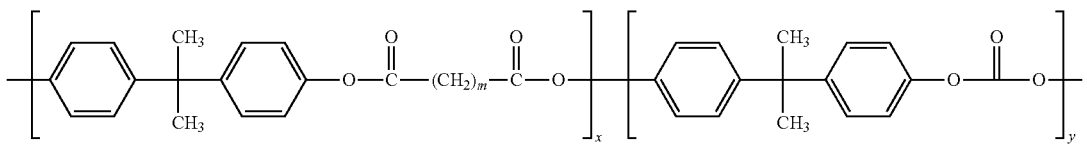

(37)

In a specific exemplary embodiment, a useful poly(aliphatic ester)-polycarbonate copolymer comprises sebacic acid ester units and bisphenol A carbonate units (formula (37), where m is 8).

Desirably, the poly(aliphatic ester)-polycarbonate has a Tg of 100 to 145° C.

Other examples of aromatic dicarboxylic acids that can be used to prepare the polyester units include isophthalic, terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids can be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98.

D of the repeating units of formula (33) can also be a $C_2$-$C_6$ alkylene group and T can be p-phenylene, m-phenylene, naphthalene, a divalent cycloaliphatic group, or a combination thereof. This class of polyester includes the poly(alkylene terephthalates).

Mixtures of the diacids can also be employed. It should be noted that although referred to as diacids, any ester precursor could be employed such as acid halides, specifically acid chlorides, and diaromatic esters of the diacid such as diphenyl, for example the diphenyl ester of sebacic acid. With reference to the diacid carbon atom number earlier mentioned, this does not include any carbon atoms which can be included in the ester precursor portion, for example diphenyl. It can be desirable that at least four, five or six carbon bonds separate the acid groups. This can reduce the formation of undesirable and unwanted cyclic species.

The polyester unit of a polyester-polycarbonate can be derived from the reaction of a combination of isophthalic and terephthalic diacids (or derivatives thereof) with resorcinol. In another embodiment, the polyester unit of a polyester-polycarbonate can be derived from the reaction of a combination of isophthalic, acid and terephthalic acid with bisphenol-A. In an embodiment, the polycarbonate units can be derived from bisphenol-A. In another specific embodiment, the polycarbonate units can be derived from resorcinol and bisphenol-A in a molar ratio of resorcinol carbonate units to bisphenol-A carbonate units of 1:99 to 99:1.

In certain embodiments, the polyester-polycarbonate is a copolymer of formula (38):

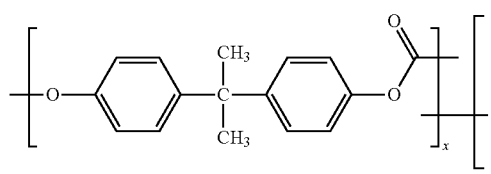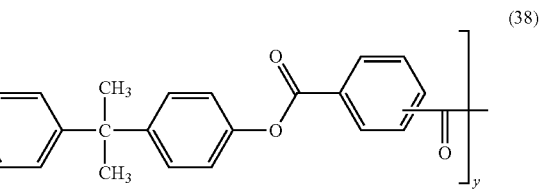

(38)

wherein the polyester-polycarbonate includes bisphenol A carbonate blocks, and polyester blocks made of a copolymer of bisphenol A with isophthalate, terephthalate or a combination of isophthalate and terephthalate. Further in the polyester-polycarbonate (38), x and y represent the respective parts by weight of the aromatic carbonate units and the aromatic ester units based on 100 parts total weight of the copolymer. Specifically, x, the carbonate content, is from more than zero to 80 wt %, from 5 to 70 wt %, still more specifically from 5 to 50 wt %, and y, the aromatic ester content, is 20 to less than 100 wt %, specifically 30 to 95 wt %, still more specifically 50 to 95 wt %, each based on the total weight of units x+y. The weight ratio of terephthalic acid to isophthalic acid can be in the range of from 5:95 to 95:5. Polyester-polycarbonate (38) comprising 35 to 45 wt % of carbonate units and 55 to 65 wt % of ester units, wherein the ester units have a molar ratio of isophthalate to terephthalate of 45:55 to 55:45 can be referred to as PCE; and copolymers comprising 15 to 25 wt % of carbonate units and 75 to 85 wt % of ester units having a molar ratio of isophthalate to terephthalate from 98:2 to 88:12 can be referred to as PPC. In these embodiments the PCE or PPC can be derived from reaction of bisphenol-A and phosgene with iso- and terephthaloyl chloride, and can have an intrinsic viscosity of 0.5 to 0.65 deciliters per gram (measured in methylene chloride at a temperature of 25° C.).

Useful polyesters can include aromatic polyesters, poly (alkylene esters) including poly(alkylene arylates), and poly (cycloalkylene diesters). Aromatic polyesters can have a polyester structure according to formula (33), wherein D and T are each aromatic groups as described hereinabove. Useful aromatic polyesters can include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these.

End capping agents can be incorporated into the polycarbonates. Exemplary chain-stoppers include certain monophenolic compounds (i.e., phenyl compounds having a single free hydroxy group), monocarboxylic acid chlorides, monocarboxylic acids, and monochloroformates. Phenolic chain-stoppers are exemplified by phenol and $C_1$-$C_{22}$ alkyl-substituted phenols such as p-cumyl-phenol, resorcinol monobenzoate, and p-tertiary-butylphenol, cresol, and monoethers of diphenols, such as p-methoxyphenol. Exemplary chain-stoppers also include cyanophenols, such as for example, 4-cyanophenol, 3-cyanophenol, 2-cyanophenol, and polycyanophenols. Alkyl-substituted phenols with branched chain alkyl substituents having 8 to 9 carbon atoms can be specifically be used. Endgroups can be derived from the carbonyl source (i.e., the diaryl carbonate), from selection of monomer ratios, incomplete polymerization, chain scission, and the like, as well as any added endcapping groups, and can include derivatizable functional groups such as hydroxy groups, carboxylic acid groups, or the like. In some embodiments, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In some embodiments, the ester endgroup derived from a salicylic ester can be a residue of bis(methyl salicyl) carbonate (BMSC) or other substituted or unsubstituted bis(alkyl salicyl) carbonate such as bis(ethyl salicyl) carbonate, bis (propyl salicyl) carbonate, bis(phenyl salicyl) carbonate, bis(benzyl salicyl) carbonate, or the like. In some embodiments, where BMSC is used as the activated carbonyl source, the endgroup is derived from and is a residue of BMSC, and is an ester endgroup derived from a salicylic acid ester as is known in the art.

The polycarbonates can be manufactured by processes such as interfacial polymerization, melt polymerization, and reactive extrusion. High Tg copolycarbonates are generally manufactured using interfacial polymerization.

Polycarbonates produced by interfacial polymerization can have an aryl hydroxy end-group content of 150 parts per million (ppm) or less, 100 ppm or less, or 50 ppm or less. Polycarbonates produced by melt polymerization can have an aryl hydroxy end-group content of greater than or equal to 350 ppm, greater than or equal to 400 ppm, greater than or equal to 450 ppm, greater than or equal to 500 ppm, greater than or equal to 550 ppm, greater than or equal to 600 ppm, greater than or equal to 650 ppm, greater than or equal to 700 ppm, greater than or equal to 750 ppm, greater than or equal to 800 ppm, or greater than or equal to 850 ppm.

Reaction conditions for interfacial polymerization can vary. An exemplary process generally involves dissolving or dispersing one or more dihydric phenol reactants, such as bisphenol-A, in aqueous caustic soda or potash, adding the resulting mixture to a water-immiscible solvent medium (e.g., methylene chloride), and contacting the reactants with a carbonate precursor (e.g., phosgene) in the presence of a catalyst such as, for example, a tertiary amine (e.g., triethylamine) or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors can include, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarhonate, dianhydride, dicarboxylic acid, diacid chloride, or any combination thereof. An interfacial polymerization reaction to form carbonate linkages can use phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_1$-$C_8$ alkoxy group or a $C_6$-$C_{18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

Specifically, polyester-polycarbonates, including the poly(aliphatic ester)-polycarbonates, can be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isoptahaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

The polymers can be manufactured using a reactive extrusion process. For example, a poly(aliphatic ester)-polycarbonate can be modified to provide a reaction product with a higher flow by treatment using a redistribution catalyst under conditions of reactive extrusion. For example, a poly(aliphatic ester)-polycarbonate with an melt volume flow rate (MVR) of less than 13 cc/10 min when measured at 250° C., under a load of 1.2 kg, can be modified to provide a reaction product with a higher flow (e.g., greater than or equal to 13 cc/10 min when measured at 250° C., under a load of 1.2 kg), by treatment using a redistribution catalyst under conditions of reactive extrusion. During reactive extrusion, the redistribution catalyst can be injected into the extruder being fed with the poly(aliphatic ester)-polycarbonate, and optionally one or more additional components.

The redistribution catalyst can be included in the extrusion process in small amounts of less than or equal to 400 parts per million (ppm) by weight, for example. The redistribution catalyst can be present in amounts of from 0.01 to 0.05 parts per hundred (pph), from 0.1 to 0.04 pph, from 0.02 to 0.03 pph, from 0.1 to 1 pph, from 1 to 500 pph, from 100 to 400 pph, from 300 to 400 pph, from 100 to 400 ppm, from 200 to 300 ppm, or from 1 to 300 ppm by weight based on the weight of the poly(aliphatic ester)-polycarbonate. The redistribution catalyst can be present in an amount of 40 to 120 ppm, specifically 40 to 110 ppm, and more specifically 40 to 100 ppm, by weight based on the weight of the poly(aliphatic ester)-polycarbonate.

The redistribution catalyst can be injected into the extruder as a diluted aqueous solution. For example, the redistribution catalyst can be a 10%, 15%, 20%, 25%, 30%, 35%, 40%, 45%, 50%, 55%, 60%, 65%, 70%, 75%, 80%, 85%, 90%, 95%, or 99% solution. The redistribution catalyst can be diluted in water.

Examples of redistribution catalysts include a tetraalkylphosphonium hydroxide, a tetraalkylphosphonium alkoxide, a tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl Particularly useful redistribution catalysts include a tetra $C_{1-6}$ alkylphosphonium hydroxide, a $C_{1-6}$ alkyl phosphonium phenoxide, or a combination comprising one or more of the foregoing catalysts. An exemplary redistribution catalyst is tetra-n-butylphosphonium hydroxide. In certain embodiments, the redistribution catalyst may not react with epoxy.

The polycarbonates can be prepared by a melt polymerization process. Generally, in the melt polymerization process, polycarbonates are prepared by co-reacting, in a molten state, the dihydroxy reactant(s) (e.g., bisphenols, aromatic dihydroxy compounds, aliphatic diols, aliphatic diacids, and any additional dihydroxy compound) and a diaryl carbonate ester, such as diphenyl carbonate, or more specifically in some embodiments, an activated carbonate such as bis(methyl salicyl) carbonate, in the presence of a transesterification catalyst. The reaction can be carried out in typical polymerization equipment, such as one or more continuously stirred tank reactors (CSTR's), plug flow reactors, wire wetting fall polymerizers, free fall polymerizers, wiped film polymerizers, BANBURY mixers, single or twin screw extruders, or combinations of the foregoing. Volatile monohydric phenol is removed from the molten reactants by distillation and the polymer is isolated as a molten residue.

A specifically useful melt process for making polycarbonates uses a diaryl carbonate ester having electron-withdrawing substituents on the aryls, which can be referred to herein as an "activated carbonate." Examples of specifically useful diaryl carbonate esters withdrawing substituents include bis(4-nitrophenyl)carbonate, bis(2-chlorophenyl) carbonate, bis(4-chlorophenyl)carbonate, bis(methyl saticyl)carbonate, bis(4-methylcarboxyphenyl)carbonate, bis(2-acetylphenyl)carboxylate, bis(4-acetylphenyl) carboxylate, or a combination comprising at least one of the foregoing. Bis(methyl salicyl)carbonate can be used as the activated carbonate in melt polycarbonate synthesis due to its lower molecular weight and higher vapor pressure.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O_2^-$), thiolate ($HS^-$), sulfide ($S_2^-$), a $C_1$-$C_{20}$ alkoxide, a $C_6$-$C_{20}$ aryloxide, a $C_1$-$C_{20}$ carboxylate, a phosphate including biphosphate, a $C_1$-$C_{20}$ phosphonate, a sulfate including bisulfate, sulfites including bisulfites and metabisulfites, a $C_1$-$C_{20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal ions salts of formic acid, acetic acid, stearic acid, and ethydenediamine tetraacetic acid. The catalyst can also comprise the salt of a non-volatile inorganic acid. By "nonvolatile," it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $Cs_2H_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In some embodiments, the transesterification catalyst is an alpha catalyst consisting essentially of an alkali or alkaline earth salt. In an exemplary aspect, the transesterification catalyst consists essentially of sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be 0.001 to 500 micromoles (μmol). In an aspect, the amount of alpha catalyst can be 0.01 to 20 μmol, specifically 0.1 to 10 μmol, more specifically 0.5 to 9 μmol, and still more specifically 1 to 7 μmol, per mole of aliphatic diol and any other dihydroxy compound present in the melt polymerization.

A second transesterification catalyst, also referred to herein as a beta catalyst, can optionally be included in the melt polymerization process, provided that the inclusion of such a second transesterification catalyst does not significantly adversely affect the desirable properties of the polymer. Exemplary transesterification catalysts can further include a combination of a phase transfer catalyst of formula $(R^{30})_4Q^+X$ above, wherein each $R^{30}$ is the same or different, and is a $C_1$-$C_{10}$ alkyl group; Q is a nitrogen or phosphorus atom; and X is a halogen atom or a $C_1$-$C_8$alkoxy group or $C_6$-$C_{18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In some embodiments, the beta catalyst is present in an amount of less than 10 ppm, specifically less than 1 ppm, more specifically less than 0.1 ppm, more specifically less than or equal to 0.01 ppm, and more specifically less than or equal to 0.001 ppm, based on the total weight of all components used in the melt polymerization reaction.

Where a combination of alpha and beta catalysts are used in the melt polymerization, polycarbonate prepared from an activated carbonate can comprise endgroups in an amount of less than 2,000 ppm, less than 1,500 ppm, or less than 1,000 ppm, based on the weight of the polycarbonate. Where only an alpha catalyst is used in the melt polymerization, a polycarbonate prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

The reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In some embodiments, the molar ratio of activated aromatic carbonate to monomer unit compounds is 1.013 to 1.29, specifically 1.015 to 1.028.

The melt polymerization reaction can be conducted by subjecting the reaction mixture to a series of temperature-pressure-time protocols. This can involve gradually raising the reaction temperature in stages while gradually lowering the pressure in stages. The pressure can be reduced from atmospheric pressure at the start of the reaction to 1 millibar (100 Pascals (Pa)) or lower, or to 0.1 millibar (10 Pa) or lower in several steps as the reaction approaches completion. The temperature can be varied in a stepwise fashion beginning at a temperature of the inciting temperature of the reaction mixture and subsequently increased to final temperature. The reaction mixture can be heated from room temperature to 150° C. The polymerization reaction can start at a temperature of 150° C. to 220° C. The polymerization temperature can be up to 220° C. The polymerization reaction can then be increased to 250° C. and then further increased to a temperature of 320° C., and all sub-ranges there between. The total reaction time can be from 30 to 200 minutes and all sub-ranges there between. This procedure will generally ensure that the reactants react to give polycarbonates with the desired molecular weight, Tg, and physical properties. The reaction proceeds to build the polycarbonate chain with production of ester-substituted alcohol by-product such as methyl salicylate. Efficient removal of the by-product can be achieved by different techniques such as reducing the pressure. Generally the pressure starts relatively high in the beginning of the reaction and is lowered progressively throughout the reaction and the temperature is raised throughout the reaction.

The progress of the reaction can be monitored by measuring the melt viscosity or the weight average molecular weight of the reaction mixture using techniques known in the art such as gel permeation chromatography (GPC). These properties can be measured by taking discreet samples or can be measured on-line. After the desired melt viscosity or molecular weight is reached, the final polycarbonate product can be isolated from the reactor in a solid or molten form. The polycarbonates can be made in a batch or a continuous process and can be carried out in a solvent free mode, Reactors chosen can be self-cleaning and can be configured to minimize "hot spots." However, vented extruders similar to those that are commercially available can be used.

The polycarbonates can be prepared in an extruder in presence of one or more catalysts, wherein the carbonating agent is an activated aromatic carbonate. The reactants for the polymerization reaction can be fed to the extruder in powder or molten form. The reactants can be dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, and the reaction temperature and the pressure reducing techniques present on the extruder. The molecular weight of the polycarbonate product can also depend upon the structures of the reactants, such as, activated aromatic carbonate, bisphenol compound(s), and the catalyst employed. Many different screw designs and extruder configurations are commercially available that use single screws, double screws, vents, back flight and forward flight zones, seals, sidestreams, and sizes. A variable for controlling the Mw when using an activated carbonate is the ratio diarylcarbonate/diol, specifically BMSC/diol. A lower ratio will give a higher molecular weight.

Decomposition by-products of the reaction that are of low molecular weight can be removed by, for example, devolatilization during reaction or extrusion to reduce the amount of such volatile compounds. The volatiles typically removed can include unreacted starting diol materials or carbonate precursor materials, but are more specifically the decomposition products of the melt-polymerization reaction.

In certain embodiments, one or more polycarbonate-polysiloxane copolymers used in the blend compositions can be produced using a continuous flow reactor. For example, in a continuous flow reactor (e.g., a tube reactor), a dihydroxy polysiloxane, dissolved in a water-immiscible solvent such as methylene chloride, can be converted by the action of phosgene and aqueous base into a mixture of mono- and bisphenol chloroformates. The mixture of chloroformates can then be treated with a catalyst, additional aqueous caustic, a dihydroxy compound (e.g., BPA), and a monophenol end capping agent to afford polycarbonate polysiloxane-copolymers. The chloroformate mixture can be transferred from the tube reactor to an interfacial polymerization reactor prior to being reacted with the dihydroxy compound (e.g., BPA).

Alternatively, in a continuous flow reactor (e.g., a tube reactor), one or more dihydroxy compounds (e.g., BPA) can be converted by the action of phosgene and aqueous base into a mixture of mono-, bis- and oligomeric chloroformates at a pH of 6 to 8 in the presence of a water-immiscible solvent (e.g., dichloromethane) and a phase transfer catalyst. The reaction mixture can then be treated with a dihydroxy polysiloxane and stirred for 5 to 20 min at pH 10 to 13. Then, more dihydroxy compound (e.g., BPA) can be added and reacted with a carbonate precursor, such as phosgene at pH 9 to 12. Subsequently, a tertiary amine catalyst can be added and the mixture again stirred with phosgene at pH 8 to 12 until the desired polycarbonate-polysiloxane molecular weight is obtained. Again, the chloroformate mixture can be transferred from the tube reactor to an interfacial polymerization reactor to complete the polymerization process at any point after formation. The most commonly used water immiscible solvents include methylene chloride, 1,2-dichloroethane, chlorobenzene, toluene, and the like.

In certain embodiments, a polysiloxane-polycarbonate copolymer used in the blend composition can be manufactured using tube reactor processes as described in U.S. Pat. Nos. 6,833,422 and 6,723,864.

In certain embodiments, a polysiloxane-polycarbonate copolymer used in the blend composition can be manufactured as described in U.S. Pat. Nos. 6,870,013 and 7,232,865.

The compositions can comprise additional components, such as one or more additives. Suitable additives include, but are not limited to impact modifiers, UV stabilizers, colorants, flame retardants, heat stabilizers, plasticizers, lubricants, mold release agents, fillers, reinforcing agents, antioxidant agents, antistatic agents, blowing agents, antidrip agents, and radiation stabilizers.

The composition can comprise heat stabilizers. Exemplary heat stabilizer additives include, for example, organophosphites such as triphenyl phosphite, tris-(2,6-dimethylphenyl)phosphite, tris-(mixed mono- and di-nonylphenyl) phosphite, tris(2,4-di-tert-butylphenyl)phosphite (Irgafos 168), or the like; phosphonates such as dimethylbenzene phosphonate or the like; phosphates such as trimethyl phosphate, or the like; or combinations comprising at least one of the foregoing heat stabilizers. In certain embodiments, the heat stabilizer is tetrakis(2,4-di-tert-butylphenyl)[1,1-biphenyl]-4,4'diylbisphosphonite. Heat stabilizers are generally used in amounts of 0.0001 to 1 part by weight, based on 100 parts by weight of the polymer component of the blend composition.

The composition can comprise plasticizers, lubricants, and mold release agents. Mold release agent (MRA) will allow the material to be removed quickly and effectively. Mold releases can reduce cycle times, defects, and browning of finished product. There is considerable overlap among these types of materials, which can include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the blend composition.

The composition can comprise an antioxidant additive. Exemplary antioxidant additives include, for example, organophosphites such as tris(nonyl phenyl)phosphite, tris (2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearyl thiopropionate, dilauryithiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-cert-butyl-4-hydroxyphenyl)-propionic acid or the like, or combinations comprising at least one of the foregoing antioxidants. Antioxidants are generally used in amounts of 0.0001 to 1 part by weight, based on 100 parts by weight of the polymer component of the blend composition.

The blend compositions can have a combination of desired properties. The compositions can have improved mechanical, thermal, or rheological properties, or a combination thereof. The compositions can have improved optical properties. The compositions can have improved melt flow and heat resistance. The compositions can have improved melt flow, heat resistance, ductility, or impact resistance. Melt flow can be evaluated by, for example, melt viscosity, melt volume flow rate, or melt flow rate. Heat resistance can be evaluated by, for example, Tg, heat deformation temperature, or Vicat softening temperature. Ductility and impact resistance can be evaluated by, for example, multi axial impact, and notched Izod impact.

The blend compositions can be particularly suitable for use in the manufacture of metallized articles. An article can be molded from the blend composition and subsequently metallized. The metallized article can have a combination of desired properties. For example, the metallized article can have a desirable minimum haze onset value, metal adhesion, corrosion resistance, or combination thereof. Melt viscosity (MV) of the blend compositions can be determined using ISO 11443 or ASTM D3835. Melt viscosity is a measurement of the rheological characteristics of a composition at temperatures and shear conditions common to processing equipment. A lower value for melt viscosity indicates that the composition flows easier. Melt viscosity can be determined at different temperatures (e.g., 260° C., 280° C., 300° C., 316° C., or 330° C.) and different shear rates (e.g., 1500 or 5000 second$^{-1}$). Melt viscosities are typically determined by pressing a molten composition through a die while measuring the pressure drop over the complete or part of the die. Melt viscosities can be measured by, for example, a Kayeness Capillary viscometer (e.g., with a capillary length: diameter ratio of 20:1, a capillary diameter of 1.0 millimeter, a capillary entrance angle of 180 degrees, and a dwell time of 4 minutes). Melt viscosity can be reported in Pascal-seconds and the shear rate can be reported in reciprocal seconds. A melt viscosity measured at a shear rate of 5000 s$^{-1}$ can be referred to as a high shear melt viscosity value.

The blend compositions can have a melt viscosity of 50 to 400 MPa, 50 to 375 MPa, 50 to 350 MPa, 50 to 325 MPa, 50 to 300 MPa, 50 to 275 MPa, 50 to 250 MPa, 50 to 225 MPa, 50 to 200 MPa, 50 to 175 MPa, 50 to 150 MPa, 100 to 375 MPa, 100 to 350 MPa, 100 to 32.5 MPa, 100 to 300 MPa, 100 to 275 MPa, 100 to 250 MPa. 100 to 225 MPa, or 100 to 200 MPa, measured in accordance with ISO 11443 at 300° C. at a shear rate of 1500 s$^{-1}$, or measured in accordance with ISO 11443 at 316° C. at a shear rate of 5000 s$^{-1}$. The blend compositions can have a melt viscosity of less than or equal to 395 MPa, less than or equal to 390 MPa, less than or equal to 385 MPa, less than or equal to 380 MPa, less than or equal to 375 MPa, less than or equal to 370 MPa, less than or equal to 365 MPa, less than or equal to 360 MPa, less than or equal to 355 MPa, less than or equal to 350 MPa, less than or equal to 345 MPa, less than or equal to 340 MPa, less than or equal to 335 MPa, less than or equal to 330 MPa, less than or equal to 325 MPa, less than or equal to 320 MPa, less than or equal to 315 MPa, less than or equal to 310 MPa, less than or equal to 305 MPa, less than or equal to 300 MPa, less than or equal to 295 MPa, less than or equal to 290 MPa, less than or equal to 285 MPa, less than or equal to 280 MPa, less than or equal to 275 MPa, less than or equal to 270 MPa, less than or equal to 265 MPa, less than or equal to 260 MPa, less than or equal to 255 MPa, less than or equal to 250 MPa, less than or equal to 245 MPa, less than or equal to 240 MPa, less than or equal to 235 MPa, less than or equal to 230 MPa, less than or equal to 225 MPa, less than or equal to 220 MPa, less than or equal to 215 MPa, less than or equal to 210 MPa, less than or equal to 205 MPa, less than or equal to 200 MPa, less than or equal to 195 MPa, less than or equal to 190 MPa, less than or equal to 185 MPa, less than or equal to 180 MPa, less than or equal to 175 MPa, less than or equal to 170 MPa, less than or equal to 165 MPa, less than or equal to 160 MPa, less than or equal to 155 MPa, less than or equal to 150 MPa, less than or equal to 145 MPa, less than or equal to 140 MPa, less than or equal to 135 MPa, less than or equal to 130 MPa, less than or equal to 125 MPa, less than or equal to 120 MPa, less than or equal to 115 MPa, less than or equal to 110 MPa, less than or equal to 105 MPa, less than or equal to 100 MPa, less than or equal to 95 MPa, less than or equal to 90 MPa, less than or equal to 85 MPa, less than or equal to 80 MPa, less than or equal to 75 MPa, less than or equal to 70 MPa, less than or equal to 65 MPa, less than or equal to 60 MPa, less than or equal to 55 MPa, or less than or equal to 50 MPa, measured in accordance with ISO 11443 at 300° C. at a shear rate of 1500 s$^-$, or measured in accordance with ISO 11443 at 316° C. at a shear rate of 5000 s$^{-1}$.

The melt stability (melt dwell) of the blend samples can be determined using a parallel plate rheometer as per ASTM D4440 or ISO 6721. The melt stability measures the change in melt viscosity over a specified period of time at a specified temperature and shear rate. The change (increase or decrease) viscosity can be measured as a percent of the initial viscosity value versus the final (30 minute) viscosity value.

The blend compositions can have a loss in melt viscosity of less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%, after 30 minutes at 330° C., measured in accordance with ISO 6721-10 or ASTM D4440.

The blend compositions can have a loss in melt viscosity of less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%, after 30 minutes at 316° C., measured in accordance with ISO 6721-10 or ASTM D4440.

The blend compositions can have a loss in melt viscosity of less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%, after 30 minutes at 300° C., measured in accordance with ISO 6721-10 or ASTM D4440.

Melt volume flow rate (MVR) of the blend compositions can be determined using ISO 1133 or ASTM D1238. MVR measures the volume of a composition extruded through an orifice at a prescribed temperature and load over a prescribed time period. The higher the MVR value of a polymer composition at a specific temperature, the greater the flow of that composition at that specific temperature.

MVR can be measured, for example, by packing a small amount of polymer composition into an extruder barrel of an extruder. The composition can be preheated for a specified amount of time at a particular temperature (the test temperature is usually set at or slightly above the melting region of the material being characterized). After preheating the composition, a particular weight (e.g., a 2.16 kg weight) can be introduced to a piston, which acts as the medium that causes extrusion of the molten polymer composition. The weight exerts a force on the piston and thereby the molten polymer composition, and the molten composition flows through the dye wherein the displacement of the molten composition is measured in cubic centimeters per over time such as 10 minutes (cm$^3$/10 min).

The compositions can have a MVR of 2 to 300 cm$^3$/10 min, 2 to 200 cm$^3$/10 min, 2 to 100 cm$^3$/10 min, 10 to 300 cm$^3$/10 min, 20 to 300 cm$^3$/10 min, 30 to 300 cm$^3$/10 min, 40 to 300 cm$^3$/10 min, 50 to 300 cm$^3$/10 min, 60 to 300 cm$^3$/10 min, 70 to 300 cm$^3$/10 min, 80 to 300 cm$^3$/10 min, 90 to 300 cm$^3$/10 min, 100 to 300 cm$^3$/10 min, 50 to 200 cm$^3$/10 min, 75 to 175 cm$^3$/10 min, or 100 to 150 cm$^3$/10 min, using the ISO 1133 method, 2.16 kg load, 330° C. temperature, 360 second dwell. The compositions can have a MVR of 5 cm$^3$/10 min or greater, 10 cm$^3$/10 min or greater, 20 cm$^3$/10 min or greater, 30 cm$^3$/10 min or greater, 40 cm$^3$/10 min or greater, 50 cm$^3$/10 min or greater, 60 cm$^3$/10 min or greater, 70 cm$^3$/10 min or greater, 80 cm$^3$/10 min or greater, 90 cm$^3$/10 min or greater, 100 cm$^3$/10 min or greater, 110 cm$^3$/10 min or greater, 120 cm$^3$/10 min or greater, 140 cm$^3$/10 min or greater, 140 cm$^3$/10 min or greater, 150 cm$^3$/10 min or greater, 160 cm$^3$/10 min or greater, 170 cm$^3$/10 min or greater, 180 cm$^3$/10 min or greater, 190 cm$^3$/10 min or greater, 200 cm$^3$/10 min or greater, 210 cm$^3$/10 min or greater, 220 cm$^3$/1 min or greater, 230 cm$^3$/10 min or greater, 240 cm$^3$/10 min or greater, 250 cm$^3$/10 min or greater, 260 cm$^3$/10 min or greater, 270 cm$^3$/10 min or greater, 280 cm$^3$/10 min or greater, 290 cm$^3$/10 min or greater, or 300 cm$^3$/10 min or greater, using the ISO 1133 method, 2.16 kg load, 330° C. temperature, 360 second dwell.

Melt flow rate (MFR) of the blend compositions can be determined using ISO 1133 or ASTM D1238. MFR measures the mass of a composition extruded through an orifice at a prescribed temperature and load over a prescribed time period. The higher the MFR value of a polymer composition at a specific temperature, the greater the flow of that composition at that specific temperature.

The compositions can have a MFR of 2 to 500 g/10 min, 2 to 300 g/10 min, 2 to 200 g/10 min, 2 to 100 g/10 min, 10 to 500 g/10 min, 20 to 500 g/10 min, 30 to 500 g/10 min, 40 to 500 g/10 min, 50 to 500 g/10 min, 60 to 500 g/10 min, 70 to 500 g/10 min, 80 to 500 g/10 min, 90 to 500 g/10 min, 100 to 500 g/10 min, 50 to 300 g/10 min, 75 to 250 g/10 min, or 100 to 200 g/10 min, using the ISO 1133 method, 2.16 kg load, 330° C. temperature, 360 second dwell. The compositions can have a MFR of 5 g/10 min or greater, 10 g/10 min or greater, 20 g/10 min or greater, 30 g/10 min or greater, 40 g/10 min or greater, 50 g/10 min or greater, 60 g/10 min or greater, 70 g/10 min or greater, 80 g/10 min or greater, 90 g/10 min or greater, 100 g/10 min or greater, 110 g/10 min or greater, 120 g/10 min or greater, 130 g/10 min or greater, 140 g/10 min or greater, 150 g/10 min or greater, 155 g/10 min or greater, 160 g/10 min or greater, 165 g/10 min or greater, 170 g/10 min or greater, 175 g/10 min or greater, 180 g/10 min or greater, 185 g/10 min or greater, 190 g/10 min or greater, 195 g/10 min or greater, 200 g/10 min or greater, 205 g/10 min or greater, 210 g/10 min or greater, 215 g/10 min or greater, 220 g/10 min or greater, 225 g/10 min or greater, 230 g/10 min or greater, 235 g/10 min or greater, 240 g/10 min or greater, 245 g/10 min or greater, or 250 g/10 min or greater, using the ISO 1133 method, 2.16 kg load, 330° C. temperature, 360 second dwell.

Glass transition temperature of the blended compositions can be determined using differential scanning calorimetry (DSC), for example, with a heating rate of 10° C./minute and using the second heating curve for Tg determination. The blend compositions can have a Tg of greater than or equal to 120° C., greater than or equal to 125° C., greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 200° C., greater than or equal to 210° C., greater than or equal to 220° C., greater than or equal to 230° C., greater than or equal to 240° C., greater than or equal to 250° C., greater than or equal to 260° C., greater than or equal to 270° C., greater than or equal to 280° C., greater than or equal to 290° C., or greater than or equal to 300° C., as measured using a differential scanning calorimetry method. The compositions can have Tgs ranging from 120 to 230° C., 140 to 185° C., 145 to 180° C. 150 to 175° C. 155 to 170° C., or 160 to 165° C. The compositions can have a Tg of 150° C., 151° C., 152° C., 153° C., 154° C., 155° C., 156° C., 157° C., 158° C., 159° C., 160° C., 161° C. 162° C., 163° C., 164° C., 165° C., 166° C., 167° C., 168° C., 169° C., 170° C., 171° C., 172° C., 173° C., 174° C., or 175° C.

Heat deflection temperature or heat distortion temperature (HDT) of the blended compositions can be determined according to ISO 75 or ASTM D648. HDT is a measure of heat resistance and is an indicator of the ability of a material to withstand deformation from heat over time. A higher HDT value indicates better heat resistance. Measurements can be performed on molded ISO bars (80×10×4 mm) preconditioned at 23° C. and 50% relative humidity for 48 hrs. The heating medium of the HDT equipment can be mineral oil. Measurements can be performed in duplicate and the average value reported.

The blend compositions can have an HDT of greater than or equal to 120° C., greater than or equal to 125° C., greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 200° C., greater than or equal to 210° C., greater than or equal to 220° C., greater than or equal to 230° C. greater than or equal to 240° C., greater than or equal to 250° C., greater than or equal to 260° C., greater than or equal to 270° C., greater than or equal to 280° C., greater than or equal to 290° C., or greater than or equal to 300° C., measured at 0.45 MPa stress or 1.8 MPa stress in accordance with ISO 75. The compositions can have heat deflection temperatures ranging from 120 to 230° C., 140 to 185° C., 145 to 180° C., 150 to 175° C., 155 to 170° C., or 160 to 165° C. measured at 0.45 MPa stress or 1.8 MPa stress in accordance with ISO 75. The compositions can have a heat deflection temperature of 150° C., 151° C., 152° C., 153° C., 154° C., 155° C., 156° C., 157° C., 158° C., 159° C., 160° C., 161° C., 162° C., 163° C., 164° C., 165° C., 166° C., 167° C., 168° C., 169° C., 170° C., 171° C., 172° C., 173° C., 174° C., or 175° C., measured at 0.45 MPa stress or 1.8 MPa stress in accordance with ISO 75.

Multiaxial impact testing (MAI) can be performed according to ISO 6603 or ASTM D3763. This procedure provides information on how a material behaves under multiaxial deformation conditions. The multiaxial impact value indicates the amount of energy the material absorbs during the test; a higher value generally indicates a better result. Impact properties that can be reported include Energy to Maximum Load, Energy to Failure, and Average Total Energy, all expressed in units of Joules. Ductility of tested parts can be expressed in percent (% D) based on whether the part fractured in a brittle or ductile manner.

Multiaxial impact can be measured using injection molded plaques (e.g., disks 3.2 mm thick and 10 centimeters in diameter). The plaques can be prepared using standard molding conditions or abusive molding conditions. Standard molding conditions can refer to a barrel temperature of 580° F. and a residence time of 35 seconds. Abusive molding conditions can refer to a barrel temperature of 580-620° F. and a residence time of 120 seconds. Abusive molding conditions can refer to conditions where the composition dwells in the molder barrel for an extended period of time or under elevated molding temperatures that can cause thermal degradation of one or more polymers in the composition. An apparatus, such as a Dynatup, can be used to evaluate multiaxial impact, and can have a tup of 10 mm, 12.5 mm, or 20 mm. The impact velocity can be 4.4 meters per second (m/s). Measurements can be conducted at various temperatures (e.g., 23° C., 0° C., −30° C.).

The blend compositions can have an Energy to Maximum Load of 10 to 250 Joules (J), 50 to 200 J, or 100 to 150 J, at 23° C., 0° C., or −30° C., molded under standard molding conditions. The blend compositions can have an Energy to Maximum Load of greater than or equal to 10 J, greater than or equal to 25 J, greater than or equal to 50 J, greater than or equal to 75 J, greater than or equal to 100 J, greater than or equal to 125 J, greater than or equal to 150 J, greater than or equal to 175 J, or greater than or equal to 200 J, at 23° C., 0° C., or −30° C., molded under standard molding conditions.

The blend compositions can have an Energy to Maximum Load of 10 J to 250 J, 50 J to 200 J, or 100 J to 150 J, at 23° C., 0° C., or −30° C., molded under abusive molding conditions. The blend compositions can have an Energy to Maximum Load of greater than or equal to 10 J, greater than or equal to 25 J, greater than or equal to 50 J, greater than or equal to 75 J, greater than or equal to 100 J, greater than or equal to 125 J, greater than or equal to 150 J, greater than or equal to 175 J, or greater than or equal to 200 J, at 23° C., 0° C., or −30° C., molded under abusive molding conditions.

The blend compositions can have an Energy to Failure of 10 J to 250 J, 50 J to 200 J, or 100 J to 150 J, at 23° C. 0° C., or −30° C., molded under standard molding conditions. The blend compositions can have an Energy to Failure of greater than or equal to 10 J, greater than or equal to 25 J, greater than or equal to 50 J, greater than or equal to 75 J, greater than or equal to 100 J, greater than or equal to 125 J, greater than or equal to 150 J, greater than or equal to 175 J, or greater than or equal to 200 J, at 23° C., 0° C., or −30° C., molded under standard molding conditions.

The blend compositions can have an Energy to Failure of 10 J to 250 J, 50 J to 200 J, or 100 J to 150 J, at 23° C., 0° C., or −30° C., molded under abusive molding conditions. The blend compositions can have an Energy to Failure of greater than or equal to 10 J, greater than or equal to 25 J, greater than or equal to 50 J, greater than or equal to 75 J, greater than or equal to 100 J, greater than or equal to 125 J, greater than or equal to 150 J, greater than or equal to 175 J, or greater than or equal to 200 J, at 23° C., 0° C., or −30° C., molded under abusive molding conditions.

The blend compositions can have an Average Total Energy of 10 J to 250 J, 50 J to 200 J, or 100 J to 150 J, at 23° C., 0° C., or −30° C., molded under standard molding conditions. The blend compositions can have an Average Total Energy of greater than or equal to 10 J, greater than or equal to 25 J, greater than or equal to 50 J, greater than or equal to 75 J, greater than or equal to 100 J, greater than or equal to 125 J, greater than or equal to 150 J, greater than or equal to 175 J, or greater than or equal to 200 J, at 23° C., 0° C., or −30° C., molded under standard molding conditions.

The blend compositions can have an Average Total Energy of 10 J to 250 J, 50 J to 200 J, or 100 J to 150 J, at 23° C., 0° C., or −30° C. molded under abusive molding conditions. The blend compositions can have an Average Total Energy of greater than or equal to 10 J, greater than or equal to 25 J, greater than or equal to 50 J, greater than or equal to 75 J, greater than or equal to 100 J, greater than or equal to 125 J, greater than or equal to 150 J, greater than or equal to 175 J, or greater than or equal to 200 J, at 23° C., 0° C., or −30° C., molded under abusive molding conditions.

The blend compositions can possess a ductility of greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a multiaxial impact test at 23° C., 0° C., or −30° C., molded under standard molding conditions.

The blend compositions can possess a ductility of greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a multiaxial impact test at 23° C. 0° C., or −30° C., molded under abusive molding conditions.

Metallization can be performed on molded parts (e.g., 1.5 mm or 3 mm thick) using a physical vapor deposition (PVD) process. This process deposits a 100-150 nm thick aluminum layer onto one side of the molded part under vacuum, followed by a protective plasma-deposited siloxane hardcoat of 50 nm.

To determine haze onset temperatures, three metallized parts can be placed in a calibrated air convection oven for 1.5 hrs. If no haze is observed, the oven temperature can be increased by 2° C. and the parts replaced with three fresh parts to avoid artifacts of in-situ annealing. Oven temperatures at which metallized parts are hazed can be recorded as haze onset temperatures. The parts used in the haze onset measurements can be dynatup parts (0.125 inch thickness) vacuum-metallized on one side (80 nm thickness aluminum coating). The parts can be conditioned for the experiments by immediately placing the freshly metallized parts in sealed bags, and conditioned at 25° C./50% relative humidity (RH) for 5 and 10 days prior to haze onset tests, while some parts can be kept unconditioned.

A metallized 1.5 mm thick or 3 mm thick sample (e.g., plaque) of the blend composition can have a haze onset temperature of greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., or greater than or equal to 175° C.

Adhesion of a metal layer to a molded article comprising the blend compositions can be evaluated using the cross-hatch adhesion test method (ASTM 3359/ISO 2409). A GT0 rating is considered the best. To conduct the test, a lattice pattern of scratches can be scratched onto a metallized plaque by first making 6 parallel cuts with a cutting tool, and thereafter making another six cuts overlapping the original cuts at a 90 degree angle. These cuts result in a cross cut area of 25 squares being obtained. All loose material can then be removed with a brush. The lattice pattern can then be covered with tape (Tesa 4651). The tape can be removed quickly. The plaque is then ready for evaluation. The cross-cut area can be evaluated and classified from GT0 to GT5 (excellent to poor).

A metallized sample of the blend composition can pass a cross-hatch adhesion test (ASTM D 3359, ISO 2409) with a GT0 metal adhesion rating. A metallized sample of the blend composition can pass a cross-hatch adhesion test (ASTM D 3359, ISO 2409) with a GT1 metal adhesion rating.

Yellowness Index (YI) for laboratory scale samples can be determined using a HunterLab Color System Yellowness Index (YI) can be measured according to ASTM D1925 on plaques of 3 mm thickness and on films of 0.2 mm thickness. Films can be prepared in a petri dish by casting from a solution of 1.1 grams of a polycarbonate in 10 ml chloroform. A molded sample of the polycarbonate blend composition can have a yellow index less than or equal to 15, less than or equal to 14, less than or equal to 13, less than or equal to 12, less than or equal to 11, less than or equal to 10, less than or equal to 9, less than or equal to 8, less than or equal to 7, less than or equal to 6, less than or equal to 5, less than or equal to 4, less than or equal to 3.5, less than or equal to 3, less than or equal to 2, less than or equal to 1, or 0, as measured according to ASTM D1925.

The optical and mechanical properties of molded thermoplastic materials are directly related to the post-molding residual stress profile of the resulting molded article. In turn, residual stress profiles within a molded article are directly influenced by the processing conditions used to manufacture the molded article. To study the resulting stress profiles qualitatively, a birefringence image comparison can be made by placing the bars in between the two cross-polarizers. Since this is a qualitative image, it is difficult to relate the information to the properties of interest.

Residual stress measurements for tensile bars can be evaluated quantitatively using a Strainoptic Technologies SCA2004P measurement system equipped with software v.1.1.1 to develop a stress map of the tensile bar.

Percent haze is an objective property that correlates with the subject property of optical clarity. Haze measurements can be performed on rectangular injection molded plaques having dimensions of 6×2.5×0.125 inches (L×W×T) following ASTM Test Method D1003. A BKY Gardner Haze-guard Plus haze meter can be used for the measurements.

A molded sample of the polycarbonate blend composition can have a haze of less than or equal to 15%, less than or equal to 14%, less than or equal to 13%, less than or equal to 12%, less than or equal to 11%, less than or equal to 10%, less than or equal to 9%, less than or equal to 8%, less than or equal to 7%, less than or equal to 6%, less than or equal to 5%, less than or equal to 4%, less than or equal to 3%, less than or equal to 2%, less than or equal to 1%, or 0%, as measured according to ASTM D1003.

Transmittance (% T) is an objective property that correlates with the subject property of optical clarity. Transmittance can be measured according to ASTM method D1003, and is defined in the following formula as:

$$\%T = (I/I_o) \times 100\%$$

wherein: I=intensity of the light passing through the test sample; and $I_o$=Intensity of incident light.

A molded sample of the polycarbonate blend composition can have a transmittance of at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, as measured according to ASTM D1003.

A metallized sample of the blend composition can pass a corrosion test. Corrosion testing can be performed via exposing metallized samples to a climate chamber at 40° C. and 98% relative humidity as described in the DIN50017. The sample can be exposed for a time period of 120 or 240 hours. A metallized sample of the blend composition can exhibit 10% or less, 9% or less, 8% or less, 7% or less, 5% or less, 4% or less, 3% or less, 2% or less, 1% or less, or 0% corrosion when stored for 120 or 240 hours at 98% relative humidity at 40° C., in accordance with DIN 50017.

Reflectivity of metallized parts can be determined. Reflectivity can be assessed using a spectrophotometer (e.g., an X-rite I-7 spectrophotometer) in reflection mode with specular light excluded (e.g., specular excluded mode using a 25 mm aperture according to ASTM D1003 using D65 illumination and a 10 degree observer angle). A mirror image has a high level of specular reflection. Hence when specular reflection is excluded from the measurement, a highly reflective, mirror like metallized surface will give low L*. A decrease in mirror like reflectivity will give more diffuse light scattering and hence give a higher L*.

A metallized sample of the blend composition can have high reflectivity. A metallized sample of the blend composition can have an L* of 20 or less, 15 or less, or 10 or less, when measured in reflection mode with specular light excluded (e.g., specular excluded mode using a 25 mm aperture according to ASTM D1003 using D65 illumination and a 10 degree observer angle).

The compositions disclosed herein can be manufactured by various methods. For example, a composition can be first mixed in a high speed HENSCHEL-Mixer. Other low shear processes, including but not limited to hand mixing, can also accomplish this blending. The mixed composition can then be fed into the throat of a single or twin-screw extruder via a hopper. Alternatively, at least one of the components can be incorporated into the composition by feeding directly into the extruder at the throat or downstream through a side-stuffer. Additives can also be compounded into a masterbatch with a desired polymeric resin and fed into the extruder. The extruder can be generally operated at a temperature higher than that necessary to cause the composition to flow. The extrudate can be immediately quenched in a water batch and pelletized. The pellets, so prepared, when cutting the extrudate can be one-fourth inch long or less as desired. Such pellets can be used for subsequent molding, shaping, or forming.

In certain embodiments, the compositions can undergo a reactive extrusion process, as described herein, by injection of a redistribution catalyst into the extruder during the extrusion process.

Shaped, formed, or molded articles comprising the polycarbonate compositions are also provided. The article can be a metallized article. The article can be metallized with, for example, chrome, nickel, or aluminum. The article can optionally include an intervening base coat between the molded article and the metal.

Articles that can be prepared using the polycarbonate compositions include, for example, automotive, aircraft, and watercraft exterior and interior components. Exemplary articles include, but are not limited to, instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, and running boards, or any combination thereof. In certain embodiments, the article is a metallized automotive bezel.

Exemplary articles include, for example, a medical device, a display device, a projector lens, a heat shield, a lighting source enclosure, a lighting source lens, a computer monitor screen, a laptop screen, a liquid crystal display screen, an organic light-emitting diode screen, computer and business machine housings (e.g., housings for monitors, handheld electronic device housings such as housings for cell phones), electrical connectors, components of lighting fixtures, ornaments, home appliances, roofs, greenhouses, sun rooms, swimming pool enclosures, electronic device casings and signs and the like.

Exemplary articles include, for example, enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications.

The article can be an automotive bezel, an automobile headlamp lens (e.g., an outer headlamp lens or an inner headlamp lens), or a headlamp assembly comprising: a headlamp lens; a headlamp reflector; a bezel; and a housing. The headlamp assembly can further comprise a tungsten-halogen, a halogen infrared reflective, or a high-intensity discharge light source.

In certain embodiments, an article molded from the thermoplastic composition (via, e.g., injection molding) has no surface defects visible to the eye on a surface thereof. In certain embodiments, when a surface of the molded article is metallized, the metallized surface has no surface defects visible to the eye. A base coat can be present between the article and the metallized surface, or the surface of the article can be directly metallized without a base coat.

In certain embodiments, a surface of an article molded from the thermoplastic composition (via, e.g., injection molding) exhibits a gloss of greater than 95 units, measured at 20 degrees using a trigloss meter. In certain embodiments, when a surface of the molded article is metallized, the metallized surface has a gloss of greater than 1000 units, greater than 1100 units, greater than 1200 units, greater than 1300 units, greater than 1400 units, greater than 1500 units, greater than 1600 units, or greater than 1700 units, measured at 20 degrees using a trigloss meter. A base coat can be present between the article and the metallized surface, or the surface of the article can be directly metallized without a base coat.

The gloss of the molded articles can be further heat stable. For example, there is provided an article formed from the compositions (via, e.g., injection molding), and having a metallized surface, wherein the metallized surface retains 80% or more, 85% or more, 90% or more, or 95% or more of its gloss after heat aging at 150° C. for 1 hour, measured at 20 degrees using a trigloss meter. A base coat can be present between the article and the metallized surface, or the surface of the article can be directly metallized without a base coat.

There is also provided an article formed from the compositions (via, e.g., injection molding), and having a metallized surface, wherein the metallized surface retains 80% or more, 85% or more, 90% or more, or 95% or more of its gloss after heat aging at 160° C. for 1 hour, measured at 20 degrees using a trigloss meter. A base coat can be present between the article and the metallized surface, or the surface of the article can be directly metallized without a base coat.

In certain embodiments, there is provided an article formed from the compositions, specifically a composition having up to 2 wt % of a particulate filler, or no filler, and having a metallized surface, wherein the metallized surface retains 80% or more, 85% or more, 90% or more, or 95% or more of its gloss after heat aging at 150° C. for 1 hour, measured at 20 degrees using a tri gloss meter. An undercoat can be present between the article and the metallized surface, or a surface of the article can be directly metallized.

In certain embodiments, there is provided an article formed from the compositions, where the compositions include one or more additives such as, for example, antioxidants, flame retardants, heat stabilizers, light stabilizers, antistatic agents, colorants, and the like. An antioxidant stabilizer composition can be used, such as for example a hindered diol stabilizer, a thioester stabilizer, an amine stabilizer, a phosphite stabilizer, or a combination comprising at least one of the foregoing types of stabilizers.

The polycarbonate compositions can be molded into useful shaped articles by a variety of methods, such as injection molding, extrusion, rotational molding, compression molding, blow molding, sheet or m extrusion, profile extrusion, gas assist molding, structural foam molding, and thermoforming. Additional fabrication operations for preparing the articles include, but are not limited to, molding, in-mold decoration, baking in a paint oven, lamination, metallization, or thermoforming.

Various types of gates can be employed for preparing molded articles, such as for example, side gates, spoke gates, pin gates, submarine gates, film gates, disk gates, or any combination thereof. Considerations in gating include part design, flow, end use requirements, and location of in-mold graphics. The standard guidelines of traditional gating can apply, along with several extra considerations. For example, one gate can be used whenever possible to minimize the potential for wrinkling a film. Gates can be located away from end-use impact as well as to provide flow from thick to thin sections to minimize weld lines. Gates can also be located at right angles to a runner to minimize jetting, splay and gate blush. Large parts requiring multiple gates can include gate positions close enough together to reduce pressure loss. Sequential gating can be used to prevent folding of a film at weld lines. Gate land lengths can be kept as short as possible. An impinging gate can be used to ensure that the incoming flow is directed against the cavity wall or core to prevent jetting. Venting (particularly full perimeter venting) can be accomplished by knock outs, cores, and parting lines and can be used whenever possible to avoid trapped gas that can burn and rupture a film. In addition, flow restrictions near gate areas can increase the potential for wash out due to increased shear. If bosses, core shutoffs, etc., are needed near a gate, rounded features or corners can be used to reduce shear. Gating for distributing injection pressure over a large area, thus reducing the shear forces at the gate, include fan gates and submarine gates that enter the part via a rib. It is common to add a puddle or thicker area at a gate entrance point for gates like valve gates, hot drops, and cashew gates.

The article can be produced by a manufacturing process. The process can include (a) providing a polycarbonate composition as disclosed herein; (h) inching the composition, for example at 200-400° C., 225-350° C., or 270-300° C. in an extruder; (c) extruding the composition; and (d) isolating the composition. The article can be further produced by (e) drying the composition and (f) melt forming the composition.

A method of preparing a metallized article can include molding a composition into a predetermined mold dimensioned to a selected article as described above; and subjecting the molded article to a metallization process (e.g., vacuum deposition processes, vacuum sputtering processes, or a combination thereof). An exemplary method can include the general steps of an initial pump down on a molded article in a vacuum chamber; glow discharge/plasma clear; and metal deposition and application of a topcoat. Exemplary metals for metallization include, but are not limited to, chronic, nickel, and aluminum. The surface of the molded item can be cleaned and degreased before vapor deposition in order to increase adhesion. A base coat can optionally be applied before metallization, for example, to improve metal layer adhesion. In certain embodiments, the metallized article is manufactured without applying a base coat prior to metallization.

A method of preparing a metallized article can include molding an article and subsequently metallizing the article using a physical vapor deposition (PVD) metallization process. During the metallization process, high vacuum can be applied and the article treated with plasma to create a polar surface to enhance adhesion. Subsequent to plasma treatment, a metal (e.g., aluminum) can be vaporized to deposit a selected thickness (e.g., 100 nm to 150 nm) of metal layer onto the article surface. This step can be followed with applying a plasma-deposit siloxane hardcoat of selected thickness (e.g., 50 nm) to protect the metal layer against oxidation and scratches.

A method of preparing a metallized article can include mounting an article (e.g., on a rack) after molding and cleaning the article (e.g., with ionized air); positioning the article in a vacuum chamber; and metallizing the article under reduced pressure (e.g., using physical vapor deposition). After metallization, a protective transparent layer can be applied to the metallized article. For example, hexamethyldisiloxane (HMDS) or SiOx can be applied in the vacuum chamber, or a silicone hard coat can be applied outside the vacuum chamber. In certain embodiments, the metallization process includes the steps of forepumping, glow discharge, high vacuum pumping, coating (thermal coating in high vacuum), cool-down time, protective coating (glow discharge polymerization), venting, and charging.

A method of preparing a metallized article can include drying a molded article (e.g., in a circulating oven) at a selected temperature (e.g., 275° F.) and time (e.g., 8 hours). The molded article can optionally be placed in a bag (e.g., ziplock bag) and heat sealed to minimize moisture uptake prior to metallization. The molded article can be placed on an open rack in a controlled environment at a selected temperature (e.g., 23° C.), and humidity (e.g., 50% relative humidity), and for a selected time (e.g., 1 to 5 days). The molded article can then be metallized (e.g., with evaporative metallization or sputtering). Evaporative metallization can include the process of having a metal resistively heated under deep vacuum that is subsequently allowed to cool onto exposed surfaces.

A method of preparing a metallized article can include providing an article into a vacuum chamber and pumping down the vacuum chamber (e.g., using a roughing pump to obtain a pressure of $8 \times 10^{-2}$ mbar, following by a fine pump to achieve a pressure of $1 \times 10^{-3}$ mbar). After the pump down, the pressure can be increased (e.g., to $2.5 \times 10^{-2}$ mbar) by adding a selected gas (e.g., argon or an oxygen/argon mixture) into the chamber. A glow discharge plasma clean can be implemented (e.g., at 40 kHz/3 kW) to prepare the article surface for metallization. The chamber can then be pumped down to a suitable pressure (e.g., $1.3 \times 10^{-4}$) prior to metallization. Next, metal deposition (e.g., aluminum deposition) can be implemented for a suitable time (e.g., 1 minute) to apply a selected thickness of metal (e.g., 70 to 100 nm). Following evaporative deposition of the metal, the pressure can be increased in the vacuum chamber (e.g., to $4 \times 10^{-2}$ mbar) in preparation for topcoat application (e.g., HMDS topcoat). The topcoat material (e.g., HDMS) can be introduced into the vacuum chamber to apply a protective layer (e.g., a 45 nm protective HMDS layer) under glow discharge conditions (e.g., for 180 min).

A method of preparing a metallized article can include an initial pump down (e.g., less than $10^{-5}$ Mbar); glow discharge pretreatment (e.g., using air, pressure of $10^{-1}$ Mbar, voltage 4 Kv, time 1 minute); pump down (e.g., less than $10^{-5}$ Mbar); thermal aluminum evaporation (e.g., in 1 minute); and plasil protective layer application under glow discharge (e.g., using air, pressure $10^{-1}$ Mbar, voltage 4 Kv, time 1 minute).

A method of preparing a metallized article can provide an article with layer thickness of, for example, 10 to 300 nm, 50 to 200 nm, 75 to 175 nm, 100 to 150 nm, or 70 to 100 nm. The thickness of the metal layer (e.g., an aluminum layer) can be 50 nm, 55 nm, 60 nm, 65 nm, 70 nm, 75 nm, 80 nm, 90 nm, 95 nm, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, or 200 nm.

A topcoat (e.g., siloxane hard-coat) can be applied to a metallized article, the topcoat having a thickness of, for example, 5 to 150 nm, 10 to 100 nm, 30 to 75 nm, 40 to 60 nm, or 45 to 55 nm. The thickness of the topcoat can be 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm.

A wide variety of articles can be manufactured using the disclosed compositions, including components for lighting articles, particularly optical reflectors. The optical reflectors can be used in automotive headlamps, headlamp bezels, headlight extensions and headlamp reflectors, for indoor illumination, for vehicle interior illumination, and the like.

In the manufacture of an optical reflector, the thermoplastic composition can be molded, an optional base coat can be applied to a surface of the article, followed by metallization of the surface. In certain embodiments, a base coat is not applied to a surface of the molded article prior to metallization. The surfaces of the molded items are smooth and good gloss can be obtained even by direct metal vapor deposition without treating the molded item with primer. Moreover, because the release properties of the molded item during injection molding are good, the surface properties of the molded item are superior without replication of mold unevenness.

The articles, in particular lighting articles, can have one or more of the following properties: very low mold shrinkage; good surface gloss even when metal layers are directly vapor deposited; no residue on the mold after long molding runs; and the vapor deposited surfaces do not become cloudy or have rainbow patterns even on heating of the vapor deposited surface. The articles further can have good heat stability.

The polycarbonate blend compositions preferably have one or more beneficial properties for the production of heat resistant articles (e.g., automotive bezels), and in particular, metallizable heat resistant articles. The polycarbonate blend compositions can exhibit a combination of desirable properties, and in particular, thermal, mechanical, and rheological properties. For example, the polycarbonate blend compositions can exhibit a combination of one or more of heat resistance, impact resistance, low temperature ductility, low melt viscosity, good melt stability, and low mold stress. The compositions can be used for the production of articles, including thin-walled articles, having superior thermal and mechanical performance compared to currently available technologies. The compositions can be particularly suitable for use in preparing metallized articles, and in particular, metallized articles exhibiting desirable haze onset temperatures, good metal adhesion to the article, and high corrosion resistance.

The polycarbonate blend compositions can include one or more components configured to enhance one or more of the thermal, mechanical, rheological, and metallization performance of the blend compositions. It has been unexpectedly found that the compositions disclosed herein can be prepared having a combination of thermal, mechanical, and rheological properties that exceed currently available technologies. In addition, the compositions can be used to prepare metallized articles to meet design demands.

The polycarbonate blend compositions can include one or more high heat polycarbonates to enhance one or more of the thermal, mechanical, rheological, and metallization performance of the blend compositions. Exemplary high heat polycarbonates for inclusion in the blend compositions include polycarbonates derived from 2-phenyl-3,3-bis(4-hydroxyphenyl)phthalimidine (PPPBP). The polycarbonate can be derived from PPPBP and Bisphenol A (BPA). The PPPBP-BPA copolymer can be prepared by interfacial polymerization or by a melt process. The PPPBP-BPA copolymer can have endcaps derived from paracumyl phenol (PCP), for example.

The PPPBP-BPA copolymer can include 1 to 50 mol % PPPBP, 10 to 45 mol % PPPBP, 15 to 40 mol % PPPBP, 20 to 35 mol % PPPBP, 25 to 40 mol % PPPBP, 25 to 35 mol % PPPBP, 30 to 35 mol % PPPBP, or 32 to 33 mol % PPPBP. The PPPBP-BPA copolymer can include 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, or 50 mol % PPPBP. The PPPBP-BPA copolymer can include 18 mol % PPPBP. The PPPBP-BPA copolymer can include 32 mol % PPPBP.

The PPPBP-BPA copolymer can have a weight average molecular weight of 15,500 to 40,000 grains per mole (g/mol), 16,000 to 35,000 g/mol, 17,000 to 30,000 g/mol, 15,500 to 25,000 g/mol, 15,500 to 23,000 g/mol, 17,000 to 23,000 g/mol, or 17,000 to 20,000 g/mol. The PPPBP-BPA copolymer, optionally having paracumyl phenol derived endcaps, can have a weight average molecular weight of 15,500 g/mol, 16,000 g/mol, 16,500 g/mol, 17,000 g/mol, 17,500 g/mol, 18,000 g/mol, 18,500 g/mol, 19,000 g/mol, 19,500 g/mol, 20,000 g/mol, 20,500 g/mol, 21,000 g/mol, 21,500 g/mol, 22,000 g/mol, 22,500 g/mol, 23,000 g/mol, 23,500 g/mol, 24,000 g/mol, 24,500 g/mol, 25,000 g/mol, 25,500 g/mol, 26,000 g/mol, 26,500 g/mol, 27,000 g/mol, 27,500 g/mol, 28,000 g/mol, 28,500 g/mol, 29,000 g/mol, 29,500 g/mol, or 30,000 g/mol. The PPPBP-BPA copolymer can have a weight average molecular weight of 17,000 g/mol, 20,000 g/mol, or 23,000 g/mol. The PPPBP-BPA copolymer can have a weight average molecular weight of 17,300 g/mol, 19,900 g/mol, or 23,000 g/mol. Weight average molecular weight can be determined by GPC using BPA polycarbonate standards.

The PPPBP-BPA copolymers can have a polydispersity index (PDI) of 1.0 to 10.0, 2.0 to 7.0, or 2.0 to 3.0. In certain embodiments, the PPPBP-BPA copolymer have a PDI of 1.00, 1.50, 2.00, 2.50, 3.00, 3.50, 4.00, 4.50, 5.00, 5.50, 6.00, 6.50, 7.00, or 7.50. In certain embodiments, the PPPBP-BPA copolymers have a PDI of 2.0, 2.1, 2.2, 2.3, 2.4, 2.5, 2.6, 2.7, 2.8, 2.9, or 3.0. In certain embodiments, the PPPBP-BPA copolymers have a PDI of 2.2 or 2.3.

The PPPBP-BPA copolymer can have a Tg of greater than or equal to 150° C., greater than or equal to 155° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 200° C., greater than or equal to 210° C., greater than or equal to 220° C., greater than or equal to 230° C., greater than or equal to 240° C., greater than or equal to 250° C., greater than or equal to 260° C., greater than or equal to 270° C., greater than or equal to 280° C., greater than or equal to 290° C., or greater than or equal to 300° C., as measured using a differential scanning calorimetry method.

The PPPBP-BPA copolymer can be present in the blend compositions in an amount ranging from 30 to 95 wt %, 35 to 95 wt %, 40 to 95 wt %, 45 to 95 wt %, 50 to 95 wt %. 55 to 95 wt %, 60 to 95 wt %, 60 to 90 wt %, 60 to 85 wt %, or 60 to 80 wt %, based on total weight of the composition. The PPPBP-BPA copolymer can be present in the blend compositions in an amount of 40 wt %, 41 wt %, 42 wt %, 43 wt %, 44 wt %, 45 wt %, 46 wt %, 47 wt %, 48 wt %, 49 wt %, 50 wt %, 51 wt %, 57 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %, based on total weight of the composition.

In certain embodiments, the blend compositions include a PPPBP-BPA copolymer selected from the group consisting of: a paracumyl phenol (PCP) end-capped linear PPPBP-BPA copolymer having a weight average molecular weight of 23,000 g/mol [± 1,000 g/mol]; a paracumyl phenol (PCP) end-capped linear PPPBP-BPA copolymer having a weight average molecular weight of 20,000 g/mol [± 1,000 g/mol]; and a paracumyl phenol (PCP) end-capped linear PPPBP-BPA copolymer having a weight average molecular weight of 17,000 g/mol [± 1,000 g/mol]; or any combination thereof; wherein the weight average molecular weight is as determined by GPC using BPA polycarbonate standards. In certain embodiments, the PPPBP-BPA copolymers include 31 mol % to 35 mol % PPPBP content, or 32 mol % to 33 mol % PPPBP content.

The polycarbonate blend compositions can include one or more polycarbonates to enhance one or more of the thermal, mechanical, rheological, and metallization performance of the blend compositions. Exemplary polycarbonates for inclusion in the blend compositions include homopolycarbonates derived from Bisphenol A. The BPA polycarbonate can be prepared by interfacial polymerization or by a melt process. The BPA polycarbonate can have endcaps derived from phenol, paracumyl phenol (PCP), or a combination thereof.

The BPA polycarbonate can have a weight average molecular weight of 17,000 to 40,000 g/mol, 17,000 to 35,000 g/mol, 17,000 to 30,000 g/mol, 17,000 to 25,000 g/mol, 17,000 to 23,000 g/mol, 17,000 to 22,000 g/mol, 18,000 to 22,000, 18,000 to 35,000 g/mol, 18,000 to 30,000 g/mol, 25,000 to 30,000 g/mol, 26,000 to 30,000 g/mol, 27,000 to 30,000 g/mol, 28,000 to 30,000 g/mol, or 29,000 to 30,000 g/mol. The BPA polycarbonate, optionally having phenol or paracumyl phenol derived endcaps, can have a weight average molecular weight of 17,000 g/mol, 17,500 g/mol, 18,000 g/mol, 18,500 g/mol, 19,000 g/mol, 19,500 g/mol, 20,000 g/mol, 20,500 g/mol, 21,000 g/mol, 21,500 g/mol, 22,000 g/mol, 22,500 g/mol, 23,000 g/mol, 23,500 g/mol, 24,000 g/mol, 24,500 g/mol, 25,000 g/mol, 25,500 g/mol, 26,000 g/mol, 26,500 g/mol, 27,000 g/mol, 27,500 g/mol, 28,000 g/mol, 28,500 g/mol, 29,000 g/mol, 29,500 g/mol, 30,000 g/mol, 30,500 g/mol, 31,000 g/mol, 31,500 g/mol, 32,000 g/mol, 32,500 g/mol, 33,000 g/mol, 33,500 g/mol, 34,000 g/mol, 34,500 g/mol, 35,000 g/mol, 35,500 g/mol, 36,000 g/mol, 36,500 g/mol, 37,000 g/mol, 37,500 g/mol, 38,000 g/mol, 38,500 g/mol, 39,000 g/mol, 39,500 g/mol, or 40,000 g/mol. The BPA polycarbonate can have a weight average molecular weight of 18,200 g/mol, 18,800 g/mol, 21,800 g/mol, 21,900 g/mol, 29,900 g/mol, or 30,000 g/mol. Weight average molecular weight can be determined by GPC using BPA polycarbonate standards.

The BPA polycarbonates can have a polydispersity index (PDI) of 1.0 to 10.0, 2.0 to 7.0, or 2.0 to 3.0. In certain embodiments, the BPA polycarbonates have a PDI of 1.00, 1.50, 2.00, 2.50, 3.00, 3.50, 4.00, 4.50, 5.00, 5.50, 6.00, 6.50, 7.00, or 7.50. In some embodiments, the BPA polycarbonates can have a PDI of 2.0, 2.1, 2.2, 2.3, 2.4, 2.5, 2.6, 2.7, 2.8, 2.9, or 3.0. In certain embodiments, the BPA polycarbonates have a PDI of 2.2 or 2.3.

The BPA polycarbonate can be present in the blend compositions in an amount ranging from 1 wt % to 60 wt %, 3 wt % to 55 wt %, 5 wt % to 50 wt %, or 10 wt % to 35 wt %, based on total weight of the composition. The BPA polycarbonate can be present in the blend compositions in an amount of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20%, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %, based on total weight of the composition.

In certain embodiments, the blend compositions include a BPA polycarbonate selected from the group consisting of: a PCP end-capped linear BPA polycarbonate having a weight average molecular weight of 18,200 g/mol [± 1,000 g/mol]; a PCP end-capped linear BPA polycarbonate having a weight average molecular weight of 18,800 g/mol [± 1,000 g/mol]; a phenol end-capped linear BPA polycarbonate having a weight average molecular weight of 21,800 g/mol [± 1,000 g/mol]; a PCP end-capped linear BPA polycarbonate having a weight average molecular weight of 21,900 g/mol [± 1,000 g/mol]; a PCP end-capped linear BPA polycarbonate having a weight average molecular weight of 29,900 g/mol [± 1,000 g/mol]; and a phenol end-capped linear BPA polycarbonate having a weight average molecular weight of 30,000 g/mol [± 1,000 g/mol]; or any combination thereof; wherein the weight average molecular weight is as determined by GPC using BPA polycarbonate standards.

The polycarbonate blend compositions can include one or more polyester-polycarbonate copolymer to enhance one or more of the thermal, mechanical, rheological, and metallization performance of the blend compositions. Exemplary polyester-polycarbonate copolymer for inclusion in the blend compositions include polycarbonates comprising aliphatic dicarboxylic acid units, and more specifically, polycarbonates including aliphatic dicarboxylic acids units and units derived from BPA. The polyester-polycarbonate copolymers can be prepared by interfacial polymerization. The polyester-polycarbonate copolymers can be prepared via a continuous flow reactor (e.g., a tube reactor). The polyester-polycarbonate copolymers can have endcaps derived from paracumyl phenol (PCP), for example.

The polyester-polycarbonate copolymer, such as a poly(aliphatic ester)-polycarbonate copolymer, can include 1 to 25 mol % aliphatic dicarboxylic acid content, 0.5 to 10 mol % aliphatic dicarboxylic acid content, 1 to 9 mol % aliphatic dicarboxylic acid content, or 3 to 8 mol % aliphatic dicarboxylic acid content. The polyester-polycarbonate copolymer, such as a poly(aliphatic ester)-polycarbonate copolymer, can include 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, or 25 mol % aliphatic dicarboxylic acid content. The polyester-polycarbonate copolymer can include 3 mol % aliphatic dicarboxylic acid content. The polyester-polycarbonate copolymer can include 4 mol % aliphatic dicarboxylic acid content. The polyester-polycarbonate copolymer can include 5 mol % aliphatic dicarboxylic acid content. The polyester-polycarbonate copolymer can include 6 mol %, aliphatic dicarboxylic acid content. The polyester-polycarbonate copolymer can include 7 mol % aliphatic dicarboxylic acid content. The polyester-polycarbonate copolymer can include 8 mol % aliphatic dicarboxylic acid content.

The poly(aliphatic ester)-polycarbonate copolymer, can include 1 to 25 mol % sebacic acid content, 0.5 to 10 mol % sebacic acid content, 1 to 9 mol % sebacic acid content, or 3 to 8 mol % sebacic acid content. The poly(aliphatic ester)-polycarbonate copolymer, can include 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, or 25 mol % sebacic acid content. The poly(aliphatic ester)-polycarbonate copolymer can include 3 mol % sebacic acid content. The poly(aliphatic ester)-polycarbonate copolymer can include 4 mol % sebacic acid content. The poly(aliphatic ester)-polycarbonate copolymer can include 5 mol % sebacic acid content. The poly(aliphatic ester)-polycarbonate copolymer can include 6 mol % sebacic acid content. The poly(aliphatic ester)-polycarbonate copolymer can include 7 mol % sebacic acid content. The poly(aliphatic ester)-polycarbonate copolymer can include 8 mol % sebacic acid content.

The poly(aliphatic ester)-polycarbonate copolymer can have from 4.0 to 12.0 mol % of sebacic acid (of the total composition). The poly(aliphatic ester)-polycarbonate copolymer can have from 5.0 to 11.0 mol %, from 6.0 to 10.0 mol %, from 4.0 to 10.0 mol %, from 7.0 to 9.0 mol %, from 7.5 to 8.5 mol %, from 5.0 to 7.0 mol %, or from 5.5 to 6.5 mol % of sebacic acid (of the total composition). The poly(aliphatic ester)-polycarbonate copolymer can have 8.25 mol % of sebacic acid (of the total composition). The poly(aliphatic ester)-polycarbonate copolymer can have 6.0 mol % of sebacic acid (of the total composition).

The polyester-polycarbonate copolymer, such as a poly(aliphatic ester)-polycarbonate copolymer can have a weight average molecular weight of 1,500 to 100,000 g/mol, 1,700 to 50,000 g/mol, 15,000 to 45,000 g/mol, 17,000 to 40,000 g/mol, 15,000 to 25,000 g/mol, 15,000 to 23,000 g/mol, or 20,000 to 25,000 g/mol. The polyester-polycarbonate copolymer, such as a poly(aliphatic ester)-polycarbonate copolymer can have a weight average molecular weight of 15,000 g/mol, 16,000 g/mol, 17,000 g/mol, 18,000 g/mol, 19,000 g/mol, 20,000 g/mol, 21,000 g/mol, 22,000 g/mol, 23,000 g/mol, 24,000 g/mol, 25,000 g/mol, 26,000 g/mol, 27,000 g/mol, 28,000 g/mol, 29,000 g/mol, 30,000 g/mol, 31,000 g/mol, 32,000 g/mol, 33,000 g/mol, 34,000 g/mol, 35,000 g/mol, 36,000 g/mol, 37,000 g/mol, 38,000 g/mol, 39,000 g/mol, or 40,000 g/mol. Weight average molecular weight can be determined by GPC using BPA polycarbonate standards.

The polyester-polycarbonate copolymer, such as a poly(aliphatic ester)-polycarbonate copolymer, can be present in the blend compositions in an amount ranging from 1 to 40 wt %, 5 to 35 wt %, or 10 to 35 wt %, based on total weight of the composition. The polyester-polycarbonate copolymer, such as a poly(aliphatic ester)-polycarbonate copolymer, can be present in the blend compositions in an amount of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 72 wt %, 23 wt %, 74 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %, based on total weight of the composition.

The polyester-polycarbonate copolymer, such as a poly (aliphatic ester)-polycarbonate copolymer, can have an MFR of 5 to 150 ml/10 min. 7 to 125 ml/10 min, 9 to 110 ml/10 min, or 10 to 100 ml/10 min, measured at 300° C. and a load of 1.2 kilograms according to ASTM D1238-04 or ISO 1133.

The polyester-polycarbonate copolymer, such as a poly (aliphatic ester)-polycarbonate copolymer, can have an MFR of 20 to 110 g/10 min, 45 to 100 g/10, 45 to 60 g/10 min, 85 to 110 g/10 min, or at least 85 g/10 min. The polyester-polycarbonate copolymer, such as a poly(aliphatic ester)-polycarbonate copolymer, can have an MFR of 45 g/10 min, 50 g/10 min, 55 g/10 min, 60 g/10 min, 65 g/10 min, 70 g/10 min, 75 g/10 min, 80 g/10 min, 85 g/10 min, 90 g/10 min, 95 g/10 min, 100 g/10 min, 105 g/10 min, 110 g/10 min, 115 g/10 min, or 120 g/10 min, measured according to ASTM D1238.

The polyester-polycarbonate copolymer, such as a poly (aliphatic ester)-polycarbonate copolymer, can have a biocontent according to ASTM-D-6866 of at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, at least 25 wt %, at least 30 wt %, at least 35 wt %, at least 40 wt %, at least 45 wt %, at least 50 wt %, at least 55 wt %, at least 60 wt %, or at least 65 wt % of the composition derived therefrom.

In certain embodiments, the blend compositions include a polyester-polycarbonate copolymer selected from the group consisting of: a PCP end-capped BPA polycarbonate-poly (aliphatic ester) copolymer comprising 6 mol % sebacic acid, and having a weight average molecular weight of 18,000 g/mol [± 1,000 g/mol], and a melt flow rate of at least 85 g/10 min, measured according to ASTM D1238 (300° C., 1.2 kgf); and a a PCP end-capped BPA polycarbonate-poly (aliphatic ester) copolymer comprising 6 mole % sebacic acid, and having a weight average molecular weight of 22,000 g/mol [± 1,000 g/mol], and a melt flow rate of 45 g/10 min to 60 g/10 min, measured according to ASTM D1238 (300° C., 1.2 kgf); or a combination thereof; wherein the weight average molecular weight is as determined by GPC using BPA polycarbonate standards.

The polycarbonate blend compositions can include one or more additives. Exemplary additives for inclusion in the blend compositions include, for example, pentaerythritol tetrastearate (PETS), pentaerythrithol tetrakis-(3-dodecylthiopropionate) (SEENOX 412S), tetrakis(2,4-di-tert-butylphenyl)[1,1-biphenyl]-4,4'-diylbisphosphonite (PEPQ), monozinc phosphate (MZP), phosphoric acid, hydroxyl octaphenyl benzotriazole, and any combination thereof.

In certain embodiments, the blend compositions include PETS, a phosphite stabilizer (e.g., Iragafos 168), and a hindered phenol (e.g., Irgafos 1076). In certain embodiments, the blend compositions include 0.27 wt % PETS, 0.08 wt % phosphite stabilizer (e.g., Iragafos 168), and 0.04 wt % hindered phenol Irgafos 1076, based on total weight of the composition.

Examples

Physical testing (e.g., heat deflection temperature, melt volume flow rate, melt flow rate, melt viscosity, melt stability, multiaxial impact) is performed according to ISO or ASTM standards. Unless indicated otherwise, all test standards refer to the version in effect in 2014.

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT is determined as flatwise under 1.82. MPa or 0.45 MPa loading with 3.2 mm (4 mm for ISO) thickness bar according to ASTM D648-2007 or IS075-2013. Results are reported in ° C.

Melt volume rate (MVR) is measured at 300° C./2.16 kg or 330° C./2.16 kg as per ASTM D 1238-2010 or ISO1133-2011. Melt viscosity (MV) is measured according to ASTM-D3835-2008 or ISO11443-2005 at a temperature of 300° C. or 316° C. and shear rate of 1500 or 5000 s$^{-1}$. Melt flow rate (MFR) is measured according to ASTM D3835-2008 or ISO 11443-2005.

The melt stability (melt dwell) of the blend samples is evaluated using a parallel plate rheometer as per ASTM D4440 or ISO 6721-2010. The sample is dried for at least 2 hours at 110° C. and loaded into the rheometer. The sample is allowed to equilibrate for 6 minutes at 260° C. and held under this condition for 30 minutes (1800 seconds) under nitrogen. The change (increase or decrease) in viscosity is measured as a percent of the initial viscosity value versus the final (30 minute) viscosity value.

Differential scanning calorimetry (DSC) employing a temperature sweep rate of 20° C./min is used to determine Tgs.

Multiaxial impact is measured according to ASTM D3763-2010 or ISO 6603-2000. Tensile modulus is measured according to ASTM D638-2010.

Percent transmission (% T), haze and reflectivity are measured according to ASTM D1003-2013.

Flammability tests can be performed following the procedure of Underwriter's Laboratory Bulletin 94 entitled "Tests for Flammability of Plastic Materials, UL94." According to this procedure, materials can be classified as V-0, V-1 or V-2 on the basis of the test results obtained for samples of 3.0 millimeter thickness. The samples are made according to the UL94 test procedure using standard ASTM molding criteria. Samples are burned in a vertical orientation after aging for 48 hours at 23° C., 50% relative humidity or 168 hours at 70° C. At least 10 injection molded bars are burned for each UL test.

Metallization is performed on molded parts from a film gate injection set-up having dimensions 60 mm×60 mm and a thickness of either 3 mm or 1.5 mm using the physical vapor deposition (PVD) process. This process deposits a 100-150 nm thick aluminum layer onto one side of the molded part under vacuum, followed by a protective plasma-deposited siloxane hard-coat of 50 nm. The initial metallization performance is assessed by 2 well-trained operators as acceptable ("OK") or not acceptable ("NOK"). Metal adhesion is tested according to the ASTM D 3359 or ISO 2409 method using a tape (Scotch 898) pull test on a metallized surface inscribed with a crosshatch, using a rating system with GT0 indicating no delamination and GT5 indicating 100% delamination. Corrosion testing is performed via exposing metallized samples to a climate chamber at 40° C. and 98% relative humidity as described in the DIN50017 procedure. Haze onset is determined as the highest temperature at which no visual defects appear after 1 hour of heat aging in an air circulating oven, exposing all sides of the sample (symmetric heating).

Molecular weight determinations are performed using GPC, using a cross-linked styrene-divinylbenzene column and calibrated to bisphenol-A polycarbonate standards using a UV-VIS detector set at 254 nm. Samples are prepared at a concentration of 1 mg/ml, and eluted at a flow rate of 1.0 ml/min.

Table 1 summarizes the exemplary materials components of the polycarbonate blend compositions. The listed copolymers and polycarbonate resins were prepared by methods known in the art. All other chemical entities were purchased from the commercial sources listed.

TABLE 1

| | | |
|---|---|---|
| PPPBP-PC-1 | PPPBP (N-Phenylphenolphthaleinylbisphenol, 2,2-Bis(4-hydro) - Bisphenol A Copolymer, 32 mol % PPPBP, Mw 23,000 g/mol, interfacial polymerization, PCP end-capped, PDI = 2-3 | SABIC |
| PPPBP-PC-2 | PPPBP (N-Phenylphenolphthaleinylbisphenol, 2,2-Bis(4-hydro) - Bisphenol a Copolymer, 32 mol % PPPBP, Mw 19,900 g/mol, interfacial polymerization, PCP end-capped, PDI = 2-3 | SABIC |
| PC-4 | Linear Bisphenol A Polycarbonate produced by interfacial polymerization, Mw 29,900 g/mol as determined by GPC using polycarbonate standards, PCP end-capped, PDI = 2-3 | SABIC |
| PC-5 | Linear Bisphenol A polycarbonate produced by interfacial polymerization, Mw 21,900 g/mol as determined by GPC using polycarbonate standards, PCP end-capped, PDI = 2-3 | SABIC |
| PE-PC-1 | Poly(aliphatic ester) - Bisphenol A polycarbonate copolymer, 6 mole % sebacic acid, Mw 18,000 g/mol as determined by GPC using polycarbonate standards, para-cumylphenol (PCP) end-capped, having a melt flow rate of 100 g/10 min measured according to ASTM D1238 (300° C., 1.2 kgf). | SABIC |
| PE-PC-2 | Poly(aliphatic ester) - Bisphenol A polycarbonate copolymer, 6 mole % sebacic acid, Mw 22,000 g/mol as determined by GPC using polycarbonate standards, para-cumylphenol (PCP) end-capped, having a melt flow rate of 55 g/10 min measured according to ASTM D1238 (300° C., 1.2 kgf). | SABIC |
| PETS | Pentaerythritol Tetrastearate | LONZA |
| Phosphite stabilizer | Tris(di-t-butylphenyl)phosphite | BASF |
| Hindered Phenol | Octadecyl 3-(3,5-di-tert-butyl-4-hydroxyphenyl)propionate | BASF |

General Sebacic Acid Copolyestercarbonate Resin Synthesis Description

Bisphenol-A and sebacic acid are weighed, then transferred to a formulation tank which contains methylene chloride, water, triethyamine (catalyst) and a small amount of aqueous sodium hydroxide. The mixture is agitated for 5 minutes and then transferred to the polymerization reactor. Phosgene is added to the reaction mixture over the course of 25 minutes. P-cumylphenol is added to the polymerization reactor over the course of five minutes during the phosgenation. Aqueous sodium hydroxide is additionally added in order to control reaction pH.

Alternatively, sebacic acid is dissolved in a mixture of water and aqueous sodium hydroxide. Bisphenol-A is weighed, then transferred to a formulation tank which contains methylene chloride, water and triethylamine (catalyst). The formulation mixture is transferred to the polymerization reactor. The sebacic acid solution is transferred to the polymerization reactor. Phosgene is added to the reaction mixture over the course of 25 minutes. P-cumylphenol is added to the reactor over the course of five minutes during the phosgenation. Aqueous sodium hydroxide is additionally added in order to control reaction pH.

After completion of the polymerization, the reaction mixture is discharged to the centrifuge feed tank. The polymer solution is purified by feeding the reaction product to a train of liquid/liquid centrifuges. The first centrifuge stage separates the reaction by product brine from the resin solution. The second centrifuge stage removes catalyst from the resin solution by washing with dilute aqueous hydrochloric acid. The third centrifuge stage removes residual ionic species by washing the resin solution with water.

The purified resin solution is then concentrated by evaporation of methylene chloride. The resin is then precipitated by co-feeding the resin solution to a jet with steam to flash off the methylene chloride. Residual methylene chloride is removed from the resin by counter current contact with steam. Excess water is removed from the resin using heated air in a fluidizing dryer.

Procedures as disclosed in U.S. Patent Application Publication No. 2013/0196131 can be employed for the synthesis of the poly(aliphatic ester)-bisphenol A polycarbonate copolymers described and used herein.

Specific Sebacic Acid Copolyestercarbonate Resin Synthesis Process Description

In a Nalgene plastic container is placed sebacic acid (242 g, 1.19 moles), 50% NaOH (280 g, 3.5 moles), and water (2500 mL) (referred to as the "sebacic acid solution"). The mixture is placed on a platform shaker and mixed until dissolved. To a formulation tank is added dichloromethane (10 L), deionized water (10 L), bisphenol-A (4268 g, 18.71 moles), the sebacic acid solution, para-cumyl phenol (163 g, 0.77 moles), triethylamine (50 g, 0.49 moles, 2.5 mol %), and sodium gluconate (10 g). The mixture is stirred and transferred to a batch reactor. The reactor agitator is started and the circulation flow is set at 80 L/min. Phosgene vapor flow to the reactor is initiated by the distributed control system (DCS) in three continuous segments separated by different pH targets. Reaction pH is controlled by DCS addition of 50% aqueous NaOH. During segment 1 (50% of total phosgene charge, 1295 g, 13.1 moles) the reaction pH target is 7.25. During segment 2 (phosgene charge 320 g, 3.2 moles) the reaction pH target is ramped from 7.25 to 10.2. Segment 3 (phosgene 965 g, 9.7 moles) maintains a pH target of 10.2 until the total phosgene setpoint is reached (2580 g, 26.0 moles). A sample of the reactor is obtained and verified to be free of unreacted BPA and free of chloroformate. Mw of the reaction sample is determined by GPC (21,500 g/mol). The reactor is purged with nitrogen and the batch is transferred to centrifuges for HCl/water wash and isolation via steam precipitation, as described above.

PE-PC-1 and PE-PC-2. Manufacture

PE-PC-1 is prepared using reactive chain-chopping chemistry with a redistribution catalyst during extrusion. The poly(aliphatic ester)-bisphenol A polycarbonate copolymer prepared in the procedure above, is mixed one or more additional components (e.g., a mold release agent (PETS), a heat stabilizer (Irgaphos)). This mixture is subjected to reactive chain chopping extrusion with a redistribution catalyst. The mixture is added to a 30 mm co-rotating twin screw (Werner & Pfleiderer; ZSK-30) extruder using a melt temperature of 300° C. with a rate of 20 kgs/hr, 20 inches of mercury vacuum and a screw speed of 400 RPM. A redistribution catalyst (tetrabutyl phosphonium hydroxide, 45% solution in water) is fed into the extruder using a separate liquid pump feeder. The extrudate is cooled under water and pelletized and dried at 120° C. for 4 hours with a desiccant bed dryer to afford PE-PC-1 (100 g/10 minutes melt flow rate at 300° C. under 1.2 kgf.

"PE-PC-2" refers to a high flow ductile thermoplastic resin having a 55 g/10 minutes melt flow rate at 300° C. under 1.2 kgf. The PE-PC-2 can be derived from a higher weight average molecular weight poly(aliphatic ester)-bisphenol A polycarbonate copolymer than that used to produce PE-PC-1. The PE-PC-2 can be prepared in a process analogous to that described for PE-PC-1 above.

Compositions comprising the thermoplastic composition can be manufactured by various methods. For example, the poly(aliphatic ester)-polycarbonate copolymer, a redistribution catalyst, and additional components can be first blended in a high speed HENSCHEL-Mixer. Other low shear processes, including but not limited to hand mixing, can also accomplish this blending. The blend can then be fed into the throat of a single or twin-screw extruder via a hopper. Alternatively, at least one of the components can be incorporated into the composition by feeding directly into the extruder at the throat or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Unless stated otherwise, the phrase "0.4 wt % additives," "0.39 wt % additives," or a derivation thereof, as used in the following tables, refers to 0.27 wt % pentaerythritol tetrastearate (PETS)+0.08 wt % phosphite stabilizer (e.g., Iragafos 168)+0.04 wt % hindered phenol (e.g., Irgafos 1076). Compositions with polyester-polycarbonate copolymers Polyester-polycarbonate copolymers were incorporated into polycarbonate blend compositions to improve flow, while maintaining good heat performance, heat resistance, and ductility. The performance properties of these compositions are displayed in Table 2.

The replacement of polycarbonate (PC-4 and PC-5) in the control (composition 1) with a lower molecular weight polyester-polycarbonate copolymer (PE-PC-1) resulted in a proportional decrease in melt viscosity for compositions 2-7. These compositions also possessed an HDT of at least 160° C. Similar HDT values were observed for compositions 8-10 upon the replacement of polycarbonate (PC-4 and PC-5) with a higher molecular weight polyester-polycarbonate copolymer (PE-PC-2). However, the PE-PC-2 copolymer had a less significant effect than PE-PC-1 on the melt viscosity of the composition. Melt viscosities were lower than the control (composition 1), but higher than the corresponding PE-PC-1 containing compositions.

Table 2 also shows the change in melt viscosity of the compositions after 30 minutes at 300° C., 316° C., 330° C., and 350° C. At 316° C., all the compositions with PE-PC-1 or PE-PC-2 displayed good melt stability with less than 5% viscosity loss. At lower temperatures of 300° C., the blends with up to 25% PE-PC-1 or PE-PC-2 had minimal (3% or lower) viscosity loss. At 330° C., compositions 2-10 maintained good melt stability (less than 15% loss in viscosity). However, at 350° C., higher viscosity losses were observed for the PE-PC-containing compositions.

The multi-axial impact energy (MAI) of these compositions were also determined and are shown in Table 2. All compositions with PE-PC-1 or PE-PC-2 possessed total energy within 10 Joules of the control (composition 1), and had at least 90% ductility under standard molding conditions. Lower amounts of 5-10% PE-PC-1 (compositions 2 and 3) slightly improved the total energy with 100% ductility. When PC-4 and PC-5 were completely replaced with PE-PC-1 (composition 7) or PE-PC-2 (composition 10), the MAI total energy was the same as the control (1), but with improved ductility. Under abusive molding conditions, the total energy values were similar to standard molding conditions for the compositions tested. Ductility was also maintained at 80-100%, with the exception of composition 10 (35% PE-PC-2).

TABLE 2

| Composition | 1 | 2 | 3 | 4 | 5 | 6 | 7 | 8 | 9 | 10 |
|---|---|---|---|---|---|---|---|---|---|---|
| PPPBP-PC-1 (%) | 63.75 | 63.75 | 63.75 | 63.75 | 63.75 | 63.75 | 63.75 | 63.75 | 63.75 | 63.75 |
| PC-4 (%) | 15.94 | 13.71 | 11.49 | 9.26 | 4.82 | 2.60 | | 4.82 | 2.60 | |
| PC-5 (%) | 19.92 | 17.15 | 14.37 | 11.60 | 6.04 | 3.26 | | 6.04 | 3.26 | |
| PE-PC-1 (%) | | 5.0 | 10.0 | 15.0 | 25.0 | 30.0 | 35.86 | | | |
| PE-PC-2 (%) | | | | | | | | 25.0 | 30.0 | 35.86 |
| PETS (%) | 0.27 | 0.27 | 0.27 | 0.27 | 0.27 | 0.27 | 0.27 | 0.27 | 0.27 | 0.27 |
| Phosphite Stab. (%) | 0.08 | 0.08 | 0.08 | 0.08 | 0.08 | 0.08 | 0.08 | 0.08 | 0.08 | 0.08 |
| Hindered Phenol (%) | 0.04 | 0.04 | 0.04 | 0.04 | 0.04 | 0.04 | 0.04 | 0.04 | 0.04 | 0.04 |
| HDT, 0.45 MPa, 3.2 mm (° C.) | 168 | 167 | 166 | 165 | 163 | — | 160 | 163 | 161 | 160 |
| Melt, vis 316° C., 5000 s$^{-1}$ (Pa-s) | 168 | 156 | 149 | 139 | 129 | — | 113 | 137 | 136 | 130 |
| Viscosity change (30 min); 300° C. (%) | −2 | −1 | −1 | 2 | 3 | — | — | — | — | — |
| Viscosity change (30 min); 316° C. (%) | −2 | −4 | −3 | −3 | −4 | −5 | −3 | −4 | −3 | −3 |
| Viscosity change (30 min); 330° C. (%) | −8 | −10 | −13 | −12 | −14 | −12 | −15 | −10 | −10 | −11 |
| Viscosity change (30 min); 350° C. (%) | −13 | −19 | −23 | −25 | −28 | −35 | −37 | −26 | −31 | −37 |
| Standard molding | | | | | | | | | | |
| MAI Total Energy, 23° C. (J) | 65 | 72 | 75 | 61 | 66 | — | 65 | 70 | 64 | 65 |
| Ductility (%) | 80 | 100 | 100 | 90 | 90 | — | 95 | 90 | 90 | 90 |

TABLE 2-continued

| Composition | 1 | 2 | 3 | 4 | 5 | 6 | 7 | 8 | 9 | 10 |
|---|---|---|---|---|---|---|---|---|---|---|
| Abusive molding | | | | | | | | | | |
| MAI Total Energy, 23° C. (J) | 73 | — | — | — | 65 | — | 69 | 68 | 72 | 60 |
| Ductility (%) | 90 | — | — | — | 100 | — | 90 | 90 | 100 | 60 |
| Yellowness Index | 3.2 | — | — | — | 3.3 | — | — | — | 3.0 | — |
| Haze (%) | 0.8 | — | — | — | 0.5 | 0.6 | — | — | 0.5 | — |
| % T | 87.1 | — | — | — | 86.5 | 89.0 | — | — | 87.1 | — |
| Metallization Data 1.5 mm metallized plaques | | | | | | | | | | |
| Visual inspection (OK) | OK | — | — | — | OK | — | — | OK | OK | — |
| Defect | — | | | | — | | | — | — | |
| Haze onset at 150° C. (P/F) | P | — | — | — | P | — | — | P | P | — |
| Haze onset at 155° C. (P/F) | P | — | — | — | P | — | — | P | F | — |
| Haze onset at 160° C. (P/F) | P | — | — | — | F | — | — | F | F | — |
| Color Metallized plaque (L*) | 7 | — | — | — | 6 | — | — | 5 | 4 | — |
| Haze onset at 150° C. (L*) | 11 | — | — | — | 9 | — | — | 9 | 19 | — |
| Haze onset at 155° C. (L*) | 11 | — | — | — | 9 | — | — | 8 | 22 | — |
| Haze onset at 160° C. (L*) | 11 | — | — | — | 13 | — | — | 13 | 27 | — |
| Cross hatch adhesion test (GT) | GT0 | — | — | — | GT0 | — | — | GT0 | GT0 | — |
| Schwitzwasser corrosion test | | | | | | | | | | |
| 2 day at 98% humidity (%) | 0 | — | — | — | 0 | — | — | 0 | 0 | — |
| 5 day at 98% humidity (%) | 0 | — | — | — | 0 | — | — | 0 | 0 | — |
| 10 day at 98% humidity (%) | 0 | — | — | — | 0 | — | — | 0 | 0 | — |

Figure 1B:
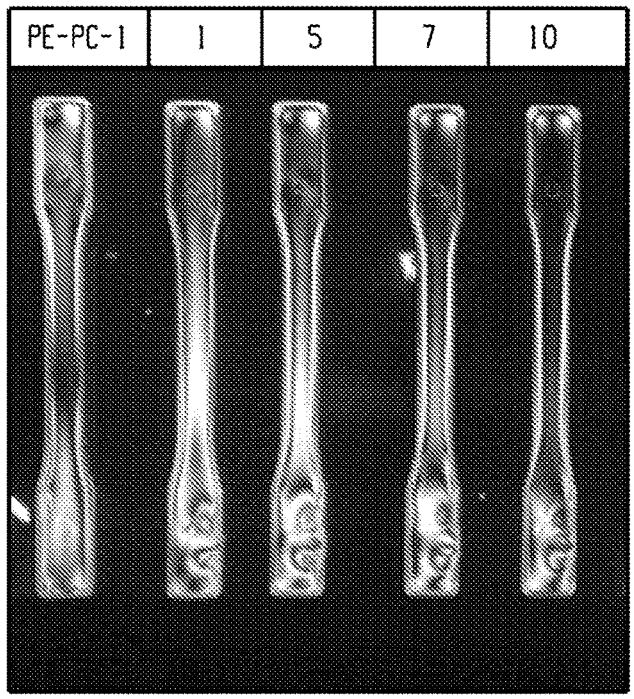
Figure 2:
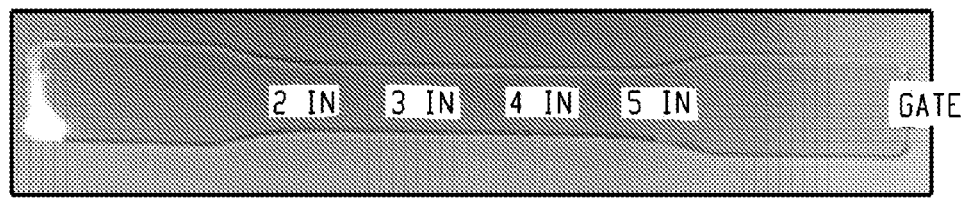
FIG. 2. depicts an exemplary tensile bar used in an analysis of retardation/birefringence/mold stress.

Tensile bars were created from compositions 1, 5, 7, 10, and PE-PC-1 under standard and abusive molding conditions. The residual stress in these tensile bars is depicted by the photograph in FIG. 1 as viewed under polarized light. A reduction in residual stress was observed as the amount of PE-PC-1 or PE-PC-2 was increased. For example, Table 3 and FIG. 2 shows that inclusion of 30% PE-PC-1 (6) significantly reduced retardation/birefringence/stress compared to the control composition (1).

TABLE 3

| Composition | Distance from end opposite gate (inches) | Average retardation (nm) | Average birefringence | Average stress (MPa) |
|---|---|---|---|---|
| 1 | 2 | 434 | 0.00043 | 5.42 |
|  | 3 | 528 | 0.00053 | 6.60 |
|  | 4 | 712 | 0.00071 | 8.90 |
|  | 5 | 785 | 0.00078 | 9.82 |
| 6 | 2 | 211 | 0.00021 | 2.64 |
|  | 3 | 436 | 0.00044 | 5.45 |
|  | 4 | 575 | 0.00057 | 7.18 |
|  | 5 | 582 | 0.00058 | 7.28 |

Further studies incorporating PE-PC-2 and PE-PC-1 into blends containing the lower molecular weight PPPBP-PC-2 and PC-5 are displayed in Table 4. Compositions containing 25% PE-PC-1 (12) and 25% PE-PC-2 (13) showed decreased melt viscosity in comparison to the control composition (11), while HDT and Tg showed little change. Both compositions 12 and 13 displayed good melt stability at temperatures up to 330° C., and MAI energy was maintained above 60 Joules with at least 80% ductility under standard and abusive conditions.

TABLE 4

| Composition | 11 | 12 | 13 |
|---|---|---|---|
| PPPBP-PC-2 (%) | 65 | 65 | 65 |
| PC-5 (%) | 34.61 | 9.61 | 9.61 |
| PE-PC-1 (%) | | 25.0 | |
| PE-PC-2 (%) | | | 25.0 |
| PETS (%) | 0.27 | 0.27 | 0.27 |
| Phosphite Stab. (%) | 0.08 | 0.08 | 0.08 |
| Hindered Phenol (%) | 0.04 | 0.04 | 0.04 |
| HDT, 0.45 MPa, 3.2 mm (° C.) | 166 | 161 | 161 |
| $T_g$ (° C.) | 172 | 171 | 170 |
| Melt, vis 316° C., 1500 $s^{-1}$ (Pa-s) | 337 | 270 | 285 |
| Melt, vis 316° C., 5000 $s^{-1}$ (Pa-s) | 164 | 139 | 143 |
| Viscosity change (30 min); 316° C. (%) | 3 | −3 | 6 |
| Viscosity change (30 min); 330° C. (%) | −5 | −17 | −6 |
| Viscosity change (30 min); 350° C. (%) | −24 | −42 | −48 |
| Standard molding | | | |
| MAI Total Energy, 23° C. (J) | 67 | 66 | 64 |
| Ductility (%) | 80 | 90 | 80 |
| Tensile modulus, 23° C. (MPa) | 2616 | 2634 | 2592 |
| Abusive molding | | | |
| MAI Total Energy, 23° C. (J) | 59 | 63 | 68 |
| Ductility (%) | 80 | 80 | 90 |
| Tensile modulus, 23° C. (MPa) | 2592 | 2606 | 2552 |
| Haze (%) | 0.5 | 0.5 | 0.5 |

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention can be made without departing from the novel aspects of the invention as defined in the claims. The appended claims should be construed broadly and in a manner consistent with the spirit and the scope of the invention herein.

For reasons of completeness, various aspects of the present disclosure are set out in the following numbered clauses:

Clause 1. An article comprising a thermoplastic composition comprising: (a) first polycarbonate that includes structural units derived from at least one of:

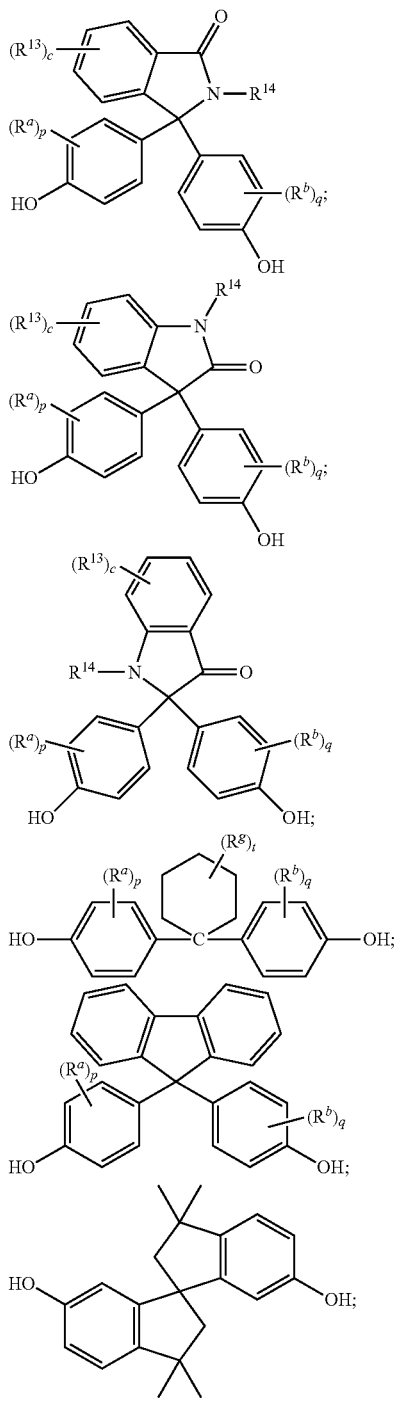

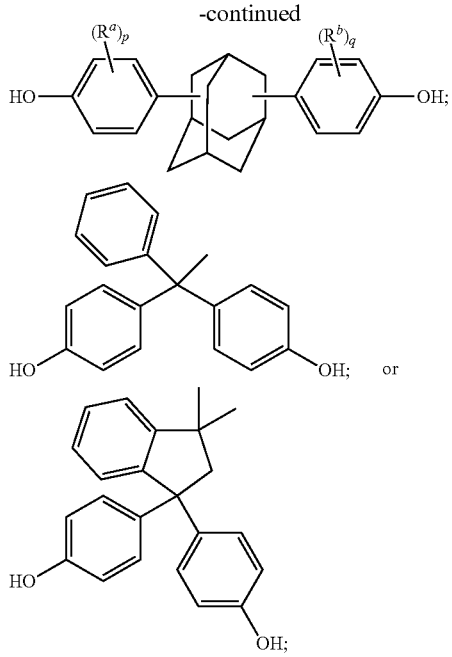

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$, alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$ alkyl or halogen, or two $R^g$ groups together with the carbon atoms to which they are attached form a four-, five-, or six-membered cycloalkyl group; and t is 0 to 10; (b) a poly(aliphatic ester)-polycarbonate copolymer of the formula:

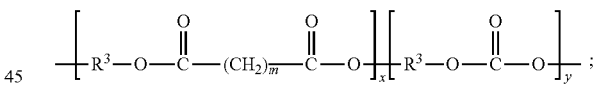

wherein m is 4 to 18; x+y is 100; and $R^3$ is formula (I) or formula (II) as described herein, and $X^a$ is formula (III) or formula (IV) as described herein; (c) optionally a second polycarbonate that is a Bisphenol A polycarbonate having a weight average molecular weight of 17,000 to 40,000 g/mol, as determined by GPC using Bisphenol A polycarbonate standards; and (d) optionally a third polycarbonate that is a Bisphenol A polycarbonate having a weight average molecular weight of 17,000 to 40,000 g/mol, as determined by GPC using Bisphenol A polycarbonate standards, provided the third polycarbonate is different from the second polycarbonate; wherein the composition has a heat deflection temperature of at least 140° C., measured at 0.45 MPa in accordance with ASTM D 648; wherein the composition has a melt viscosity of less than 170 Pa·s, measured in accordance with ISO 11443 at 316° C. at a shear rate of 5000 $s^{-1}$.

Clause 2. The article of clause 1, wherein a molded sample of the composition obtained under standard molding conditions has a multiaxial impact energy of at least 55 J at 23° C., as measured in accordance with ASTM D 3763.

Clause 3. The article of clause 1 or clause 2, wherein a molded sample of the composition obtained under standard molding conditions has a ductility of at least 70% at 23° C., as measured in accordance with ASTM D 3763.

Clause 4. The article of any one of clauses 1-3, wherein a molded sample of the composition obtained under abusive molding conditions has a multiaxial impact energy of at least 50 J at 23° C., as measured in accordance with ASTM D 3763.

Clause 5. The article of any one of clauses 1-4, wherein a molded sample of the composition obtained under abusive molding conditions has a ductility of at least 50% at 23° C., as measured in accordance with ASTM D 3763.

Clause 6. The article of any one of clauses 1-5, wherein the composition has a loss in melt viscosity of less than 20% after 0 minutes at 330° C., measured in accordance with ISO 6721-10 and ASTM D4440.

Clause 7. The article of any one of clauses 1-6, wherein the composition has a loss in melt viscosity of less than 10% after 30 minutes at 316° C., measured in accordance with ISO 6721-10 and ASTM D4440.

Clause 8. The article of any one of clauses 1-7, wherein the first polycarbonate includes structural units derived from at least one of:

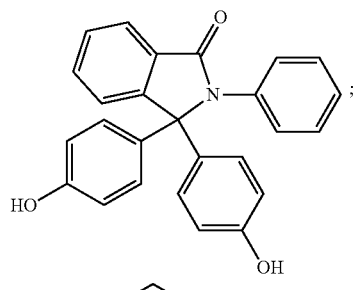

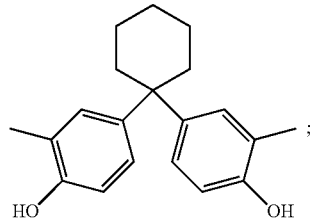

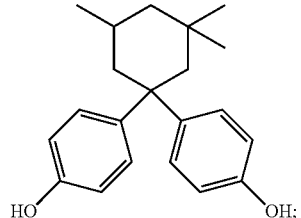

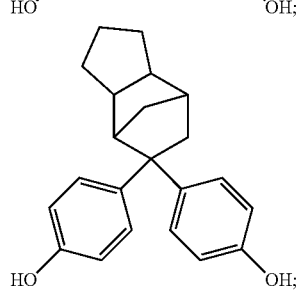

-continued

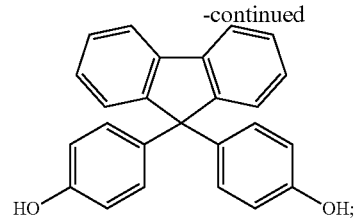

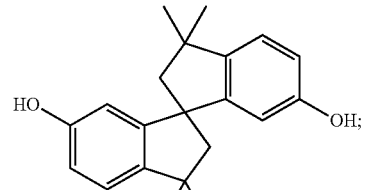

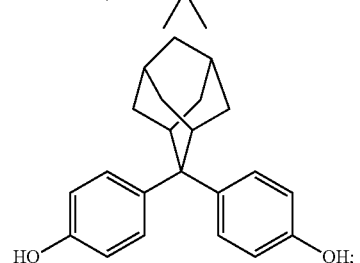

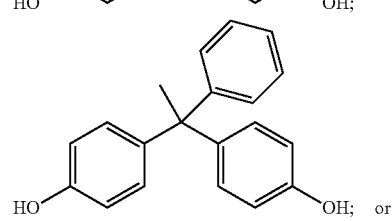 or

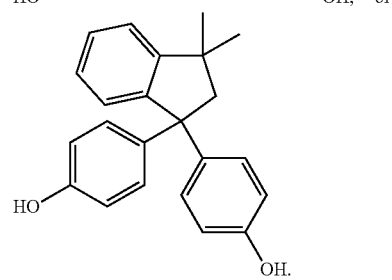

Clause 9. The article of any one of clauses 1-8, wherein the first polycarbonate comprises at least 50 mol % structural units derived from Bisphenol A, and has a Tg of at least 170° C.

Clause 10. The article of any one of clauses 1-9, wherein the first polycarbonate comprises structural units derived from PPPBP, wherein the PPPBP content is at most 50 mol %, and wherein the first polycarbonate has a Tg of at least 170° C.

Clause 11. The article of any one of clauses 1-10, wherein the first polycarbonate comprises structural units derived from PPPBP, wherein the PPPBP content is at most 40 mol %, and wherein the first poly carbonate has a Tg of at least 170° C.

Clause 12. The article of any one of clauses 1-11, wherein the first polycarbonate comprises 15 mol % to 40 mol % structural units derived from PPPBP.

Clause 13. The article of any one of clauses 1-12, wherein the first polycarbonate comprises 31 mol % to 35 mol % structural units derived from PPPBP.

Clause 14. The article of any one of clauses 1-13, wherein the first polycarbonate comprises structural units derived from one, and has a weight average molecular weight of 15,500 to 40,000 g/mol, as determined by GPC using Bisphenol A polycarbonate standards.

Clause 15. The article of any one of clauses 1-14, wherein the first polycarbonate is selected from: a para-cumylphenol end-capped polycarbonate comprising structural units derived from PPPBP and BPA, having a weight average molecular weight of 23,000 g/mol to 40,000 g/mol as determined by GPC using BPA polycarbonate standards; and a para-cumylphenol end-capped polycarbonate comprising structural units derived from PPPBP and BPA, having a weight average molecular weight of 17,000 to 20,000 g/mol, as determined by GPC using BPA polycarbonate standards.

Clause 16. The article of any one of clauses 1-15, wherein the first polycarbonate is selected from: a para-cumylphenol end-capped polycarbonate comprising structural units derived from PPPBP and BPA, having a weight average molecular weight of 20,000 g/mol as determined by GPC using Bisphenol A polycarbonate standards; and a para-cumylphenol end-capped polycarbonate comprising structural units derived from PPPBP and BPA, having a weight average molecular weight of 23,000 g/mol, as determined by GPC using BPA polycarbonate standards.

Clause 17. The article of any one of clauses 1-16, wherein the poly(aliphatic ester)-polycarbonate copolymer has a weight average molecular weight of 15,000 to 25,000 g/mol, as determined by GPC using BPA polycarbonate standards.

Clause 18. The article of any one of clauses 1-17, wherein the poly(aliphatic ester)-polycarbonate copolymer has a Tg of at least 100° C.

Clause 19. The article of any one of clauses 1-18, wherein the poly(aliphatic ester)-polycarbonate copolymer has the formula:

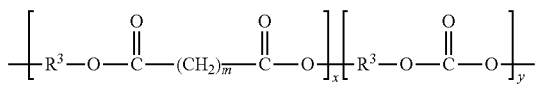

wherein m is 8 to 10.

Clause 20. The article of any one of clauses 1-19, wherein the poly(aliphatic ester)-polycarbonate copolymer has the formula:

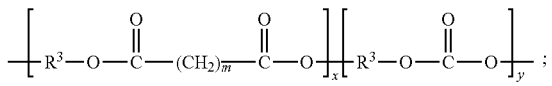

wherein in is 8; and $R^3$ is

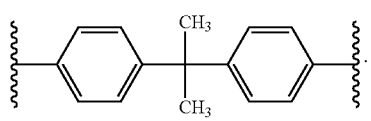

Clause 21. The article of any one of clauses 1-20, wherein the poly(aliphatic ester)-polycarbonate copolymer is selected from a para-cumylphenol end-capped polyester-polycarbonate copolymer comprising structural units derived from sebacic acid and BPA, having a weight average molecular weight of 18,000 g/mol, as determined by GPC using BPA polycarbonate standards; and a melt flow rate of at least 85 g/10 min, measured according to ASTM D1238 (300° C., 1.2 kgf); and a para-cumylphenol end-capped polyester-polycarbonate copolymer comprising structural units derived from sebacic acid and BPA, having a weight average molecular weight of 22,000 g/mol, as determined by GPC using BPA polycarbonate standards; and a melt flow rate of 45 to 60 g/10 min, measured according to ASTM D1238 (300° C., 1.2 kgf).

Clause 22. The article of any one of clauses 1-21, wherein the poly(aliphatic ester)-polycarbonate copolymer is obtained via modification of a higher molecular weight poly(aliphatic ester)-polycarbonate copolymer by treatment with a redistribution catalyst under conditions of reactive extrusion.

Clause 23. The article of any one of clauses wherein the second polycarbonate is a PCP end-capped linear BPA polycarbonate having a weight average molecular weight of 18,200 g/mol, as determined by GPC using BPA polycarbonate standards; a PCP end-capped linear BPA polycarbonate having a weight average molecular weight of 18,800 g/mol, as determined by GPC using BPA polycarbonate standards; a phenol end-capped linear BPA polycarbonate having a weight average molecular weight of 21,800 g/mol as determined by GPC using BPA polycarbonate standards; a PCP end-capped linear BPA polycarbonate having a weight average molecular weight of 21,900 g/mol as determined by GPC using Bisphenol A polycarbonate standards; a para-cumylphenol end-capped linear Bisphenol A polycarbonate having a weight average molecular weight of 29,900 g/mol as determined by GPC using Bisphenol A polycarbonate standards; or a phenol end-capped linear Bisphenol A polycarbonate having a weight average molecular weight of 30,000 g/mol as determined by GPC using Bisphenol A polycarbonate standards.

Clause 24. The article of any one of clauses 1-23, wherein the second polycarbonate is a linear BPA polycarbonate produced by interfacial or melt polymerization.

Clause 25. The article of any one of clauses 1-24, wherein the second polycarbonate is a BPA polycarbonate produced by interfacial or melt polymerization, having a weight average molecular weight of 29,900 g/mol as determined by GPC using BPA polycarbonate standards.

Clause 26. The article of any one of clauses 1-25, wherein the third polycarbonate is a PCP end-capped linear BPA polycarbonate having a weight average molecular weight of 18,200 g/mol, as determined by GPC using BPA polycarbonate standards; a PCP end-capped linear BPA polycarbonate having a weight average molecular weight of 18,800 g/mol, as determined by GPC using BPA polycarbonate standards; a phenol end-capped linear BPA polycarbonate having a weight average molecular weight of 21,800 g/mol as determined by GPC using BPA polycarbonate standards; a PCP end-capped linear BPA polycarbonate having a weight average molecular weight of 21,900 g/mol as determined by GPC using BPA polycarbonate standards; a PCP end-capped linear BPA polycarbonate having a weight average molecular weight of 29,900 g/mol as determined by GPC using BRA polycarbonate standards; or a phenol end-capped linear Bisphenol A polycarbonate having a weight average molecular weight of 30,000 g/mol as determined by GPC using Bisphenol A polycarbonate standards.

Clause 27. The article of any one of clauses 1-26, wherein the third polycarbonate is a linear Bisphenol A polycarbonate produced by interfacial or melt polymerization.

Clause 28. The article of any one of clauses 1-27, wherein the third polycarbonate is a Bisphenol A polycarbonate produced by interfacial or melt polymerization, having a weight average molecular weight of 21,900 g/mol as determined by GPC using Bisphenol A polycarbonate standards.

Clause 29. The article of any one of clauses 1-28, wherein the composition comprises 40 to 85 wt % of the first polycarbonate; 1 to 40 wt % of the poly(aliphatic ester)-polycarbonate copolymer; optionally 1 to 40 wt % of the second polycarbonate; optionally 1 to 40 wt % of the third polycarbonate; provided that the combined wt % value of all components does not exceed 100 wt %.

Clause 30. The article of any one of clauses 1-29, wherein the composition comprises 0.3 to 5 wt % of additives; wherein the additives comprise impact modifiers, UV stabilizers, colorants, flame retardants, heat stabilizers, plasticizers, lubricants, mold release agents, fillers, reinforcing agents, antioxidant agents, antistatic agents, blowing agents, anti-drip agents, radiation stabilizers, or any combination thereof.

Clause 31. The article according to any one of clauses 1-30, wherein the composition is selected from the group consisting of (1) to (7): (1) a composition comprising 63.75 wt % of the first polycarbonate; 5 wt % of the poly(aliphatic ester)-polycarbonate copolymer; 13.71 wt % of the second polycarbonate; 17.15 wt % of the third polycarbonate; and 0.39 wt % of additives; (2) a composition comprising 63.75 wt % of the first polycarbonate; 10 wt % of the poly(aliphatic ester)-polycarbonate copolymer; 11.49 wt % of the second polycarbonate; 14.37 wt % of the third polycarbonate; and 0.39 wt % of additives; (3) a composition comprising 63.75 wt % of the first polycarbonate; 15 wt % of the poly(aliphatic ester)-polycarbonate copolymer; 9.26 wt % of the second polycarbonate; 11.60 wt % of the third polycarbonate; and 0.39 wt % of additives; (4) a composition comprising 63.75 wt % of the first polycarbonate; 25 wt % of the poly(aliphatic ester)-polycarbonate copolymer; 4.82 wt % of the second polycarbonate; 6.04 wt % of the third polycarbonate; and 0.39 wt % of additives; (5) a composition comprising 63.75 wt % of the first polycarbonate; 30 wt % of the poly(aliphatic ester)-polycarbonate copolymer; 2.60 wt % of the second polycarbonate; 3.26 wt % of the third polycarbonate; and 0.39 wt % of additives; (6) a composition comprising 63.75 wt % of the first polycarbonate; 35.86 wt % of the poly(aliphatic ester)-polycarbonate copolymer; and 0.39 wt % of additives; (7) a composition comprising 65 wt % of the first polycarbonate; 25 wt % of the poly(aliphatic ester)-polycarbonate copolymer; 9.61 wt % of the third polycarbonate; and 0.39 wt % of additives.

Clause 32. The article of any one of clauses 1-31, wherein a flame bar comprising the composition achieves a UL94 V2 rating at a thickness of 3.0 mm.

Clause 33. The article of any one of clauses 1-32, wherein a flame bar comprising the composition demonstrates a probability of first time pass (pFTP) of the UL94 V2 test of 0.85 to 1.00, tested at a thickness of 3.0 mm.

Clause 34. The article of any one of clause 1-33, wherein a tensile bar prepared from the composition exhibits a residual stress that is inversely proportional to the amount of the poly(aliphatic ester)-polycarbonate copolymer in the composition.

Clause 35. The article of any one of clauses 1-34, wherein a 1.5 mm plaque comprising the composition, metallized with a 100 nm to 150 nm thick aluminum layer using a physical vapor deposition process, and protected with a plasma-deposited siloxane hard-coat of 50 nm, has a minimum haze onset temperature of 150° C. or greater.

Clause 36. The article of clause 35, wherein the plaque achieves a GT0 metal adhesion rating when measured in accordance with ASTM D 3359 or ISO 2409.

Clause 37. The article of clause 35 or 36, wherein the plaque has 0% corrosion in a 10 day Schwitzwasser corrosion test at 98% humidity.

Clause 38. The article of any one of clauses 1-37 wherein the composition has a heat deflection temperature of at least 150° C., measured at 0.45 MPa in accordance with ASTM D 648.

Clause 39. The article of any one of clauses 1-38, wherein the composition has a heat deflection temperature of at least 155° C., measured at 0.45 MPa in accordance with ASTM D 648.

Clause 40. The article of any one of clauses 1-39, wherein the composition has a melt viscosity of less than 150 Pa·s, measured in accordance with ISO 11443 at 316° C. at a shear rate of 5000 s$^{-1}$.

Clause 41. The article of any one of clauses 1-40, wherein the composition has a melt viscosity of less than 130 Pa·s, measured in accordance with ISO 11443 at 316° C. at a shear rate of 5000 s$^{-1}$.

Clause 42. The article of any one of clauses 1-41, wherein a plaque comprising the composition has a yellowness index of less than 6.5, measured in accordance with ASTM D1925.

Clause 43. The article of any one of clauses 1-42, wherein a plaque comprising the composition has a % T of at least 80%, measured in accordance with ASTM D1003.

Clause 44. The article of any one of clauses 1-43, wherein a plaque comprising the composition has a haze of 2% or less, measured in accordance with ASTM D1003-00.

Clause 45. The article of any one of clauses 1-44, selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, running boards, instrument screens, helmet or other protective device, fire helmets, face shields, safety glasses, eyeglasses, light fixtures, flashlight and lantern tenses, light fixtures, and motor vehicle headlight lenses and covers, or any combination thereof.

Clause 46. The article of any one of clauses 1-45, wherein the article is a metallized article.

What is claimed is:

1. An article comprising a thermoplastic composition comprising:
(a) 40 to 85 wt % of a first polycarbonate that includes structural units derived from at least one of:

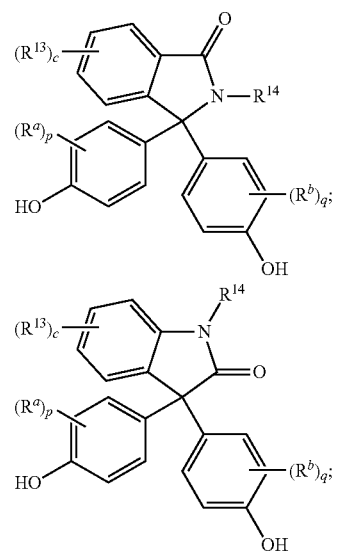

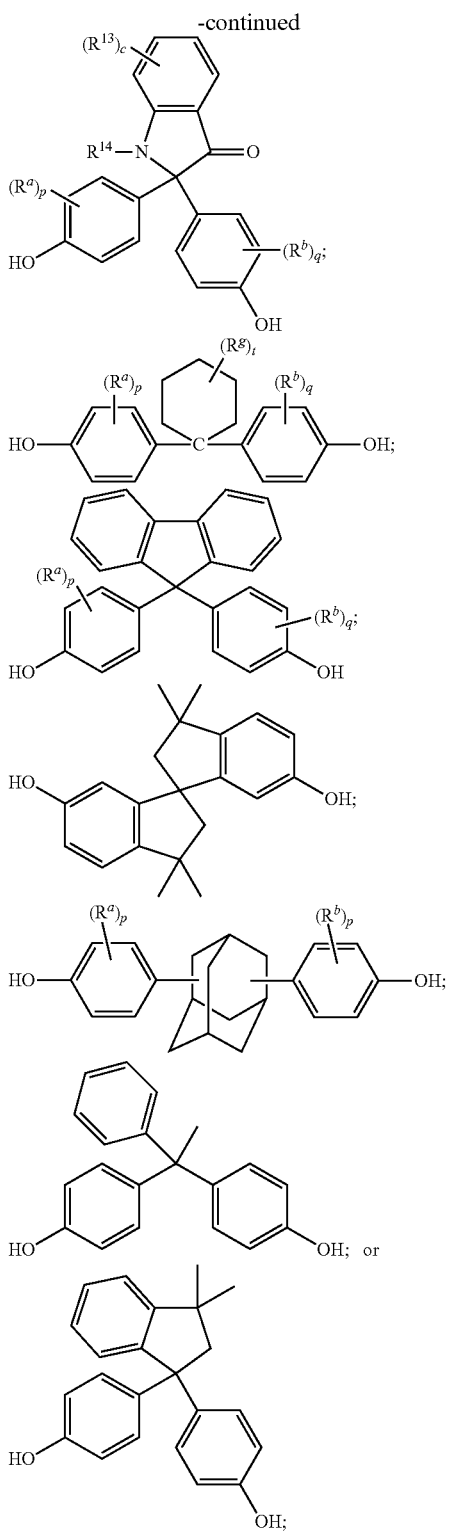

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$ alkyl or halogen, or two $R^g$ groups together with the carbon atoms to which they are attached form a four-, five, or six-membered cycloalkyl group; and t is 1 to 10;

(b) 1 to 25 wt % of a poly(aliphatic ester)-polycarbonate copolymer comprising carbonate units and ester units and having the formula:

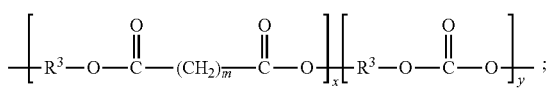

wherein m is 4 to 18; x, and y each represents parts by weight of the carbonate units and the ester units based on 100 parts total weight of the poly(aliphatic ester)-polycarbonate copolymer, x+y is 100; and $R^3$ is formula (I) or formula (II):

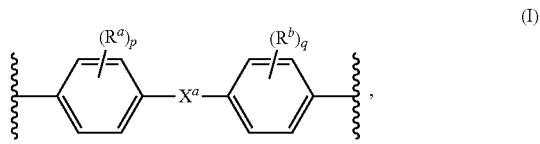

wherein $R^h$ is halogen, alkyl, or haloalkyl; n is 0 to 4; and $X^a$ is formula (III) or formula (IV):

wherein $R^c$ and $R^d$ are each independently hydrogen, halogen, alkyl, cycloalkyl, cycloalkylalkyl, aryl, arylalkyl, heterocyclyl, heterocyclylalkyl, heteroaryl, or heteroarylalkyl; and $R^e$ is a divalent alkyl group;

(c) 1 to 40 wt % of a second polycarbonate that is a Bisphenol A polycarbonate homopolymer having a weight average molecular weight of 17,000 to 40,000 g/mol, as determined by gel permeation chromatography using Bisphenol A polycarbonate standards; and (d) optionally 1 to 40 wt % of a third polycarbonate that is a Bisphenol A polycarbonate homopolymer having a weight average molecular weight of 17,000 to 40,000 g/mol, as determined by gel permeation chromatography using Bisphenol A polycarbonate standards, provided the third polycarbonate is different from the second polycarbonate, provided that the combined wt % value of all components does not exceed 100 wt %;

wherein the composition has a heat deflection temperature of at least 140° C., measured at 0.45 MPa in accordance with ASTM D 648;

wherein the composition has a melt viscosity of less than 170 Pa·s, measured in accordance with ISO 11443 at 316° C. at a shear rate of 5000 s$^{-1}$.

2. The article of claim 1, wherein a molded sample of the composition obtained under standard molding conditions has a multiaxial impact energy of at least 55 Joules and a ductility of at least 70% at 23° C., as measured in accordance with ASTM D 3763.

3. The article of claim 1, wherein the composition has a loss in melt viscosity of less than 20% after 30 minutes at 330° C. and a loss in melt viscosity of less than 10% after 30 minutes at 316° C., measured in accordance with ISO 6721-10 and ASTM D4440.

4. The article of claim 1, wherein the first polycarbonate comprises structural units derived from 3,3-bis(4-hydroxyphenyl)-2-phenylisoindolin-1-one, wherein the 3,3-bis(4-hydroxyphenyl)-2-phenylisoindolin-1-one content is at most 40 mol %, and wherein the first polycarbonate has a Tg of at least 170° C.

5. The article of claim 1, wherein the first polycarbonate comprises structural units derived from 3,3-bis(4-hydroxyphenyl)-2-phenylisoindolin-1-one, and has a weight average molecular weight of 15,500 to 40,000 g/mol, as determined by gel permeation chromatography using BPA polycarbonate standards.

6. The article of claim 1, wherein the first polycarbonate is selected from:
a para-cumylphenol end-capped polycarbonate comprising structural units derived from 3,3-bis(4-hydroxyphenyl)-2-phenylisoindolin-1-one and Bisphenol A, having a weight average molecular weight of 20,000 g/mol as determined by gel permeation chromatography using Bisphenol A polycarbonate standards; and
a para-cumylphenol end-capped polycarbonate comprising structural units derived from 3,3-bis(4-hydroxyphenyl)-2-phenylisoindolin-1-one and Bisphenol A, having a weight average molecular weight of 23,000 g/mol, as determined by gel permeation chromatography using Bisphenol A polycarbonate standards.

7. The article of claim 1, wherein the poly(aliphatic ester)-polycarbonate copolymer has a weight average molecular weight of 15,000 to 25,000 g/mol, as determined by gel permeation chromatography using Bisphenol A polycarbonate standards; wherein the poly(aliphatic ester)-polycarbonate copolymer has a Tg of at least 100° C.

8. The article of claim 1, wherein the poly(aliphatic ester)-polycarbonate copolymer has the formula:

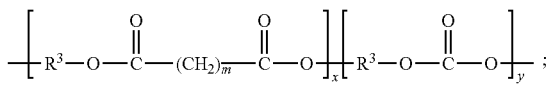

wherein m is 8; and R$^3$ is

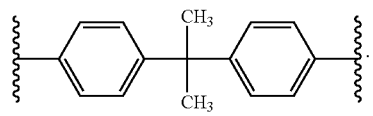

9. The article of claim 1, wherein the poly(aliphatic ester)-polycarbonate copolymer is selected from a para-cumylphenol end-capped polyester-polycarbonate copolymer comprising structural units derived from sebacic acid and Bisphenol A, having a weight average molecular weight of 18,000 g/mol, as determined by gel permeation chromatography using Bisphenol A polycarbonate standards; and a melt flow rate of at least 85 g/10 min, measured according to ASTM D1238 (300° C., 1.2 kgf); and a para-cumylphenol end-capped polyester-polycarbonate copolymer comprising structural units derived from sebacic acid and Bisphenol A, having a weight average molecular weight of 22,000 g/mol, as determined by gel permeation chromatography using Bisphenol A polycarbonate standards; and a melt flow rate of 45 g/10 min to 60 g/10 min, measured according to ASTM D1238 (300° C., 1.2 kgf).

10. The article of claim 1, wherein the second polycarbonate is
a para-cumylphenol end-capped linear Bisphenol A polycarbonate homopolymer having a weight average molecular weight of 18,200 g/mol, as determined by gel permeation chromatography using Bisphenol A polycarbonate standards;
a para-cumylphenol end-capped linear Bisphenol A polycarbonate homopolymer having a weight average molecular weight of 18,800 g/mol, as determined by gel permeation chromatography using Bisphenol A polycarbonate standards;
a phenol end-capped linear Bisphenol A polycarbonate homopolymer having a weight average molecular weight of 21,800 g/mol as determined by gel permeation chromatography using Bisphenol A polycarbonate standards;
a para-cumylphenol end-capped linear Bisphenol A polycarbonate homopolymer having a weight average molecular weight of 21,900 g/mol as determined by gel permeation chromatography using Bisphenol A polycarbonate standards;
a para-cumylphenol end-capped linear Bisphenol A polycarbonate homopolymer having a weight average molecular weight of 29,900 g/mol as determined by gel permeation chromatography using Bisphenol A polycarbonate standards; or
a phenol end-capped linear Bisphenol A polycarbonate homopolymer having a weight average molecular weight of 30,000 g/mol as determined by gel permeation chromatography using Bisphenol A polycarbonate standards.

11. The article of claim 1, wherein the second polycarbonate is a Bisphenol A polycarbonate homopolymer produced by interfacial or melt polymerization, having a weight average molecular weight of 29,900 g/mol as determined by gel permeation chromatography using Bisphenol A polycarbonate standards.

12. The article according to claim 1, wherein a 1.5 mm plaque comprising the composition, metallized with a 100 nm to 150 nm thick aluminum layer using a physical vapor deposition process, and protected with a plasma-deposited siloxane hard-coat of 50 nm, has a minimum haze onset temperature of 150° C. or greater, and the plaque achieves a GT0 metal adhesion rating when measured in accordance with ASTM D 3359 or ISO 2409.

13. The article of claim 1, wherein the composition has a heat deflection temperature of at least 155° C., measured at 0.45 MPa in accordance with ASTM D 648.

14. The article of claim 1, wherein the composition has a melt viscosity of less than 150 Pa·s, measured in accordance with ISO 11443 at 316° C. at a shear rate of 5000 s$^{-1}$.

15. The article of claim 1, wherein a plaque comprising the composition has a yellowness index of less than 4, measured in accordance with ASTM D1925.

16. The article of claim 15, wherein a plaque comprising the composition has a percent transmission of at least 80% and a haze of 2% or less, measured in accordance with ASTM D1003.

17. The article of claim 1, selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, running boards, instrument screens, helmet or other protective device, fire helmets, face shields, safety glasses, eyeglasses, light fixtures, flashlight and lantern lenses, light fixtures, and motor vehicle headlight lenses and covers, or any combination thereof.

18. The article of claim 1, wherein the third polycarbonate is present in the thermoplastic composition in an amount of 1 to 40 wt %.

19. The article of claim 1, wherein the thermoplastic composition comprises
60 to 85 wt. % of the first polycarbonate;
5 to 25 wt. % of the poly(aliphatic ester)-polycarbonate copolymer; and
5 to 15 wt. % of the second polycarbonate.

20. The article of claim 19, wherein the third polycarbonate is
a para-cumylphenol end-capped linear Bisphenol A polycarbonate homopolymer having a weight average molecular weight of 18,200 g/mol, as determined by gel permeation chromatography using Bisphenol A polycarbonate standards;
a para-cumyl phenol end-capped linear Bisphenol A polycarbonate homopolymer having a weight average molecular weight of 18,800 g/mol, as determined by gel permeation chromatography using Bisphenol A polycarbonate standards;
a phenol end-capped linear Bisphenol A polycarbonate homopolymer having a weight average molecular weight of 21,800 g/mol as determined by gel permeation chromatography using Bisphenol A polycarbonate standards;
a para-cumylphenol end-capped linear Bisphenol A polycarbonate homopolymer having a weight average molecular weight of 21,900 g/mol as determined by gel permeation chromatography using Bisphenol A polycarbonate standards;
a para-cumylphenol end-capped linear Bisphenol A polycarbonate homopolymer having a weight average molecular weight of 29,900 g/mol as determined by gel permeation chromatography using Bisphenol A polycarbonate standards; or
a phenol end-capped linear Bisphenol A polycarbonate homopolymer having a weight average molecular weight of 30,000 g/mol as determined by gel permeation chromatography using Bisphenol A polycarbonate standards.

21. The article of claim 19, wherein the third polycarbonate is a Bisphenol A polycarbonate homopolymer produced by interfacial or melt polymerization, having a weight average molecular weight of 21,900 g/mol as determined by gel permeation chromatography using Bisphenol A polycarbonate standards.

* * * * *